US009646167B2

(12) United States Patent
Lewis

(10) Patent No.: US 9,646,167 B2
(45) Date of Patent: May 9, 2017

(54) UNLOCKING A PORTABLE ELECTRONIC DEVICE BY PERFORMING MULTIPLE ACTIONS ON AN UNLOCK INTERFACE

(71) Applicant: Light Cone Corp., Trabuco Canyon, CA (US)

(72) Inventor: Curtis Lewis, Trabuco Canyon, CA (US)

(73) Assignee: Light Cone Corp., Trabuco Canyon, CA (US)

( * ) Notice: Subject to any disclaimer, the term of this patent is extended or adjusted under 35 U.S.C. 154(b) by 46 days.

(21) Appl. No.: 14/727,686

(22) Filed: Jun. 1, 2015

(65) Prior Publication Data
US 2016/0350548 A1    Dec. 1, 2016

(51) Int. Cl.
| | |
|---|---|
| *H04L 9/32* | (2006.01) |
| *G06F 21/62* | (2013.01) |
| *G06F 3/0488* | (2013.01) |
| *G06F 3/0482* | (2013.01) |
| *G06F 3/0484* | (2013.01) |
| *G06T 11/60* | (2006.01) |
| *G06F 17/24* | (2006.01) |
| *G06F 21/45* | (2013.01) |

(52) U.S. Cl.
CPC ........ *G06F 21/6218* (2013.01); *G06F 3/0482* (2013.01); *G06F 3/04845* (2013.01); *G06F 3/04883* (2013.01); *G06F 17/24* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 6,980,081 B2 | 12/2005 | Anderson | |
| 7,657,849 B2 | 2/2010 | Chaudhri et al. | |
| 8,127,141 B2 | 2/2012 | Hypponen | |
| 8,745,544 B2 * | 6/2014 | Chaudhri | ............ G06F 3/04883 345/173 |
| 8,862,079 B2 * | 10/2014 | Kim | ........................ H04B 1/04 455/127.4 |

(Continued)

OTHER PUBLICATIONS

Design of Lock Based Authentication System for Android Smartphone user. Jadhav et al. IJARCS(2014).*

*Primary Examiner* — Venkat Perungavoor
(74) *Attorney, Agent, or Firm* — Knobbe, Martens, Olson & Bear, LLP

(57) ABSTRACT

The disclosure provided herein includes a multi-step authentication process to unlock a portable electronic device. To unlock the device, a user can use a touch screen on the device to select an access category, to select an access subcategory, and to enter an access subcategory value. The access subcategory can depend on the access category, making them logically related. The access subcategory value can be a value that corresponds to the selected access category and subcategory. The multi-step authentication or unlocking process can advantageously be easy to remember because the pieces of information to be provided are logically related to one another. In addition, the multi-step authentication or unlocking process can be difficult to guess as each step in the process decreases the chances an unwanted person or system correctly guesses the correct values for each step.

27 Claims, 11 Drawing Sheets

(56) References Cited

U.S. PATENT DOCUMENTS

| | | | |
|---|---|---|---|
| 8,963,869 B2* | 2/2015 | Hicks | G06F 21/36 345/156 |
| 9,182,902 B2* | 11/2015 | Lin | G06F 3/0488 |
| 2005/0188222 A1 | 8/2005 | Motsinger et al. | |
| 2008/0052245 A1 | 2/2008 | Love | |
| 2010/0174903 A1 | 7/2010 | Christophani | |
| 2011/0154483 A1 | 6/2011 | Wang et al. | |
| 2011/0162052 A1 | 6/2011 | Hayward | |
| 2012/0023574 A1 | 1/2012 | Osborn et al. | |
| 2014/0092039 A1* | 4/2014 | Ito | G06F 21/36 345/173 |
| 2014/0114703 A1 | 4/2014 | Cashman et al. | |
| 2014/0189597 A1* | 7/2014 | Kang | G06F 3/0488 715/835 |

* cited by examiner

UNLOCKING A PORTABLE ELECTRONIC DEVICE BY PERFORMING MULTIPLE ACTIONS ON AN UNLOCK INTERFACE

BACKGROUND

Field

The systems and methods disclosed herein relate generally to user interfaces that employ touch-sensitive displays, and more particularly, to the unlocking of user interfaces on portable electronic devices.

Description of Related Art

Touch-sensitive displays (also known as "touch screens" or "touchscreens") are widely used in portable electronic devices to display graphics and text and to provide a user interface through which a user may interact with the device. A touch screen detects and responds to contact on the touch screen. A device may display one or more soft keys, menus, and other user-interface objects on the touch screen. A user may interact with the device by contacting the touch screen at locations corresponding to the user-interface objects with which the user wishes to interact. To reduce or eliminate unwanted interaction with a portable electronic device, the device can operate in a locked state until the user performs one or more predefined actions on the touch screen or with other user interface elements on the device. If the user successfully performs the predefined actions, the device can enter an unlocked state allowing the user to more fully utilize the device.

SUMMARY

The systems, methods and devices of the disclosure each have innovative aspects, no single one of which is indispensable or solely responsible for the desirable attributes disclosed herein. Some of the advantageous features of some embodiments will now be summarized.

Touch screens are becoming more popular for use as displays and as user input devices on portable devices, such as laptops, mobile telephones, tablets, smartwatches, electronic accessories, and personal digital assistants (PDAs). One problem associated with using touch screens on portable devices is the unintentional activation or deactivation of functions due to unintentional contact with the touch screen. Thus, portable devices or applications on a portable device can enter a locked state upon satisfaction of predefined lock conditions, such as after a predetermined time of idleness has elapsed or upon manual locking by a user.

Devices with touch screens and/or applications running on such devices may be unlocked using typical unlocking procedures, such as entering a PIN, entering a password, performing a gesture on the touch screen, and the like. These unlock procedures, however, have drawbacks. In some instances, creating, memorizing, and recalling passwords, codes, gestures and the like can be quite burdensome. To reduce this burden, users may often configure unlocking procedures that are easy to guess. This may leave the portable device susceptible to unwanted access by another person. On the other hand, making unlocking the device more difficult, such as by using a longer, more complicated password, may make unlocking the device more difficult and may reduce the quality of the user experience. Ultimately, these drawbacks may reduce the security of the device and, as a consequence, the use of the device in contexts where security may be desirable.

Accordingly, there is a need for more efficient, user-friendly procedures for unlocking such devices, touch screens, and/or applications. More generally, there is a need for more efficient, user-friendly procedures for transitioning such devices, touch screens, and/or applications between user interface states. For example, the procedures can include transitioning from a user interface state for a first application to a user interface state for a second application, between user interface states in the same application, or between locked and unlocked states. In addition, there is a need for a method of providing a way to access a device or application using information that is easy to remember but difficult to guess, to reduce or prevent unwanted access.

In a first aspect, a method of unlocking a portable electronic device is provided where the device includes a touch-sensitive display. The method includes displaying on the touch-sensitive display an unlock interface. The unlock interface includes a plurality of access category images, wherein each of the plurality of access category images is a graphical, interactive user-interface object with which a user may interact. The unlock interface also includes an active category image different from the plurality of access category images, wherein the active category image is a graphical object that has two states, a first state prior to interaction with an access category image and a second state to indicate interaction with an access category image. The unlock interface also includes an access subcategory image, wherein the access subcategory image is a graphical, interactive user-interface object with which a user may interact. The unlock interface also includes an access subcategory value image, wherein the access subcategory value image is a graphical object configured to display information corresponding to a received subcategory value. The method further includes displaying the active category image in the first state. The method also includes detecting a contact with the touch-sensitive display on one of the plurality of access category images displayed on the touch-sensitive display, loading an access category corresponding to the access category image displayed at the detected contact, and displaying the active category image in the second state. The method includes modifying the access subcategory image to display an image corresponding to one of a plurality of access subcategories, the plurality of access subcategories corresponding to the loaded access category. The method also includes detecting a contact with the touch-sensitive display on the access subcategory image displayed on the touch-sensitive display, loading an access subcategory corresponding to the access subcategory image displayed at a time of the detected contact, receiving an access subcategory value, and modifying the access subcategory value window to display an image corresponding to the received access subcategory value. The method then includes comparing the loaded access category, the loaded access subcategory, and the received access subcategory value to stored access credentials, the stored access credentials comprising an unlock category, an unlock subcategory, and an unlock value. If the loaded access category matches the unlock category, the loaded access subcategory matches the unlock subcategory, and the received subcategory value matches the unlock value, the method includes unlocking the portable electronic device and ceasing to display the unlock interface. If the loaded access category does not match the unlock category or the loaded access subcategory does not match the unlock subcategory or the received access subcategory value does not match the unlock value, the method includes maintaining the device in a locked state and displaying a magnified version of the unlock interface wherein the magnification is based at least in part on differences between the loaded access category and the unlock category, differences between the loaded access subcategory and the unlock subcategory, and/or differences between the received access subcategory value and the unlock value. The unlock category, the unlock subcategory, and the unlock value are related to one another as logically related pieces of information.

In some embodiments of the first aspect, the unlock category comprises a radio station category, the unlock access subcategory comprises one of a city or a station call number, and the unlock value corresponds to the city or the station call number of the unlock access subcategory. In some embodiments of the first aspect, the unlock category comprises a professional sports team, the unlock subcategory comprises one of a player jersey number or a team name, and the unlock value corresponds to the player jersey number or the team name of the unlock access subcategory. In some embodiments of the first aspect, the unlock category comprises a television show, the unlock subcategory comprises one of a cast name or a show seasons number, and the unlock value corresponds to the cast name or the show seasons number of the unlock subcategory. In some embodiments of the first aspect, the unlock category comprises arts awards, the unlock subcategory comprises one of an album name or an award year, and the unlock value corresponds to the album name or the award year of the unlock subcategory. In some embodiments of the first aspect, there are a plurality of unlock values corresponding to respective unlock access subcategories, wherein the unlock category comprises a radio station category, the unlock access subcategories comprise a city and a station call number, and a first unlock value corresponds to the city unlock access subcategory and a second unlock value corresponds to the station call number of the unlock access subcategory.

In some embodiments of the first aspect, displaying the magnified version of the unlock interface comprises displaying a portion of the unlock interface such that the portion fills the touch-sensitive display. In a further embodiment, the magnification increases by a first value if the loaded access category does not match the unlock category, by a second value if the loaded access subcategory does not match the unlock subcategory, and by a third value if the received access subcategory value does not match the unlock value. In yet another further embodiment, the method further includes aggregating the magnification over a plurality of unsuccessful unlock attempts. In yet another further embodiment, the method further includes entering a secured state after the portable device is powered on if the portable device is powered down after displaying the magnified version of the unlock interface. In yet another further embodiment, entering the secured state comprises displaying a secure lock interface comprising a parameter violation image, wherein the parameter violation image is a graphical, interactive user-interface object with which a user interacts to enter an exit code. In yet another further embodiment, the method includes comparing the entered exit code to a stored exit code and displaying the unlock interface if the entered exit code matches the stored exit code.

In some embodiments of the first aspect, the unlock interface further comprises a plurality of mandatory access category images, wherein each mandatary access category image is a graphical object configured to display information corresponding to a number of mandatory access categories. In a further embodiment, the number of mandatory access categories corresponds to a number of access categories for which an access subcategory must be loaded and for which an access subcategory value must be received prior to unlocking the portable electronic device. In yet another further embodiment, the number of mandatory access categories is greater than or equal to 2. In yet another further embodiment, the number of mandatory access categories is less than or equal to 4.

In a second aspect, a method for unlocking a portable electronic device is provided wherein the electronic device includes a touch-sensitive display. The method includes displaying on the touch-sensitive display an unlock interface. The unlock interface includes a plurality of access category images, wherein each of the plurality of access category images is a graphical, interactive user-interface object with which a user may interact; an active category image different from the plurality of access category images, wherein the active category image is a graphical object that has two states, a first state prior to interaction with an access category image and a second state to indicate interaction with an access category image; an access subcategory image, wherein the access subcategory image is a graphical, interactive user-interface object with which a user may interact; and an access subcategory value image, wherein the access subcategory value image is a graphical object configured to display information corresponding to a received subcategory value. The method further includes displaying the active category image in the first state, detecting a contact with the touch-sensitive display on one of the plurality of access category images displayed on the touch-sensitive display, and displaying the active category image in the second state. The method includes modifying the access subcategory image to display an image corresponding to one of a plurality of access subcategories, the plurality of access subcategories corresponding to the loaded access category. The method further includes detecting a contact with the touch-sensitive display on the access subcategory image displayed on the touch-sensitive display and modifying the access subcategory value window to display an image corresponding to a received access subcategory value. The method includes unlocking the portable electronic device if the loaded access category matches a stored unlock category, the loaded access subcategory matches a stored unlock subcategory, and the received subcategory value matches a stored unlock value; and displaying a magnified version of the unlock interface if the loaded access category does not match the stored unlock category or the loaded access subcategory does not match the stored unlock subcategory or the received access subcategory value does not match the stored unlock value. The magnification is based at least in part on differences between the loaded access category and the stored unlock category, differences between the loaded access subcategory and the stored unlock subcategory, and/or differences between the received access subcategory value and the stored unlock value.

In some embodiments of the second aspect, the method also includes displaying a magnified version of the unlock interface based at least in part on differences between the stored access credentials and received input. In a further embodiment, the method also includes displaying a secure lock screen if the portable device is powered down after displaying the magnified version of the unlock interface.

In some embodiments of the second aspect, each of the plurality of category images comprises a geometrical shape with text within the geometrical shape. In some embodiments of the second aspect, the unlock interface comprises at least one graphical object to indicate if there has been a security violation. In some embodiments of the second aspect, the unlock interface comprises at least one graphical object to indicate if at least one access subcategory value has been received. In some embodiments of the second aspect, receiving user input indicating the access subcategory comprises detecting a touch on the access subcategory image when the access subcategory image corresponds to a particular access subcategory. In some embodiments of the second aspect, receiving user input indicating the access subcategory comprises receiving an indication to change a displayed access subcategory image followed by detecting a touch on the access subcategory image corresponding to a particular access subcategory. In some embodiments of the second aspect, the user-interface object corresponding to the access subcategory value is configured to allow entry of text. In some embodiments of the second aspect, the user-interface object corresponding to the access subcategory value is configured to allow entry of a number.

In some embodiments of the second aspect, the portable electronic device comprises a smartwatch. In some embodiments of the second aspect, the portable electronic device comprises a smartphone. In some embodiments of the second aspect, the portable electronic device comprises a tablet.

In a third aspect, a method is provided for unlocking an electronic device having a touch-sensitive display. The method includes displaying an unlock interface, detecting a contact with a first unlock interface element, loading a first access credential based on the detected contact with the first unlock interface element, detecting a contact with a second unlock interface element, loading a second access credential based on the detected contact with the second unlock interface element, determining a difference between the first access credential and a first stored unlock credential, determining a difference between the second access credential and a second stored unlock credential, and displaying a magnified version of the unlock interface where there is a difference between the first access credential and the first stored unlock credential or where there is a difference between the second access credential and the second stored unlock credential.

In a fourth aspect, a method is provided for unlocking an electronic device having a touch-sensitive display. The method includes displaying an unlock interface, detecting a contact with a first unlock interface element, loading a first access credential based on the detected contact with the first unlock interface element, detecting a contact with a second unlock interface element, loading a second access credential based on the detected contact with the second unlock interface element, determining a difference between the first access credential and a first stored unlock credential, and limiting the number of attempts to unlock the electronic device based on the differences between the first access credential and the first stored unlock credential and the differences between the second access credential and the second stored unlock credential.

The aforementioned methods may be performed by a portable electronic device having a touch-sensitive display with a graphical user interface (GUI), one or more processors, memory and one or more modules, programs or sets of instructions stored in the memory for performing these methods. In some embodiments, the portable electronic device provides a plurality of functions, including wireless communication.

Instructions for performing the aforementioned methods may be included in a computer program product configured for execution by one or more processors. In some embodiments, the executable computer program product includes a computer readable storage medium (e.g., one or more magnetic disk storage devices, flash memory devices, or other non-volatile solid state memory devices) and an executable computer program mechanism embedded therein.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Although aspects of the embodiments described in this disclosure will focus, for the purpose of illustration, on a portable electronic device such as a smartphone, one skilled in the art will appreciate that the techniques disclosed herein may be applied to a number of devices, processes, or applications. For example, systems and methods of entering access credentials in a sequential manner may be used for other purposes, such as accessing applications on computers, on in-vehicle entertain systems or computers, accessing electronic devices of various types such as automatic teller machines (ATMs), accessing media content over the Internet, entering building structures (e.g., commercial, educational, industrial, and/or residential structures), and accessing physical objects (e.g., accessing safe deposit boxes at a bank), or the like. Various aspects of the disclosure will now be described with regard to certain examples and embodiments, which are intended to illustrate but not limit the disclosure. In some instances, well-known methods, procedures, components, and circuits have not been described in detail so as not to unnecessarily obscure aspects of the embodiments.

Figure 1:
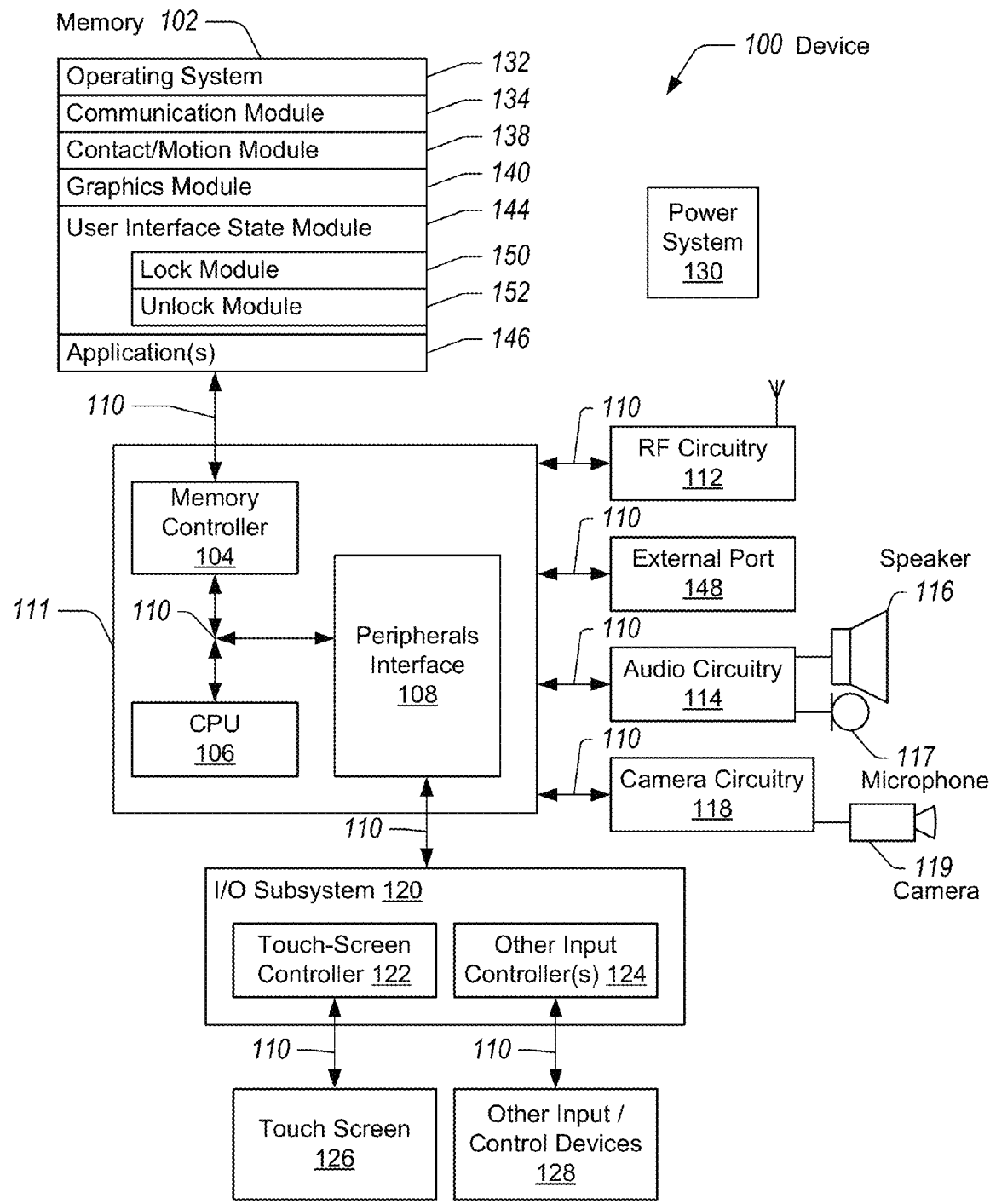
FIG. 1 illustrates a block diagram of an example portable electronic device.

FIG. 1 illustrates a block diagram of an example portable electronic device 100. The device 100 includes a memory 102, a memory controller 104, one or more processing units (CPU's) 106, a peripherals interface 108, RF circuitry 112, audio circuitry 114, a speaker 116, a microphone 117, an input/output (I/O) subsystem 120, a touch screen 126, other input or control devices 128, and an external port 148. These components communicate over the one or more communication buses or signal lines 110. The device 100 can be any portable electronic device, including but not limited to a handheld computer, a tablet computer, a mobile phone, a media player, a personal digital assistant (PDA), a laptop, a smartwatch, a smart electronic accessory, a television, or the like, including a combination of two or more of these items. It should be appreciated that the device 100 is only one example of a portable electronic device 100, and that the device 100 may have more or fewer components than shown, or a different configuration of components. The various components shown in FIG. 1 may be implemented in hardware, software or a combination of both hardware and software, including one or more signal processing and/or application specific integrated circuits.

The memory 102 may include high speed random access memory and may also include non-volatile memory, such as one or more magnetic disk storage devices, flash memory devices, or other non-volatile solid state memory devices. In some embodiments, the memory 102 may farther include storage remotely located from the one or more processors 106, for instance network attached storage accessed via the RF circuitry 112 or external port 148 and a communications network (not shown) such as the Internet, intranet(s), Local Area Networks (LANs), Wide Local Area Networks (WLANs), Storage Area Networks (SANs) and the like, or any suitable combination thereof. Access to the memory 102 by other components of the device 100, such as the CPU 106 and the peripherals interface 108, may be controlled by the memory controller 104.

The peripherals interface 108 couples the input and output peripherals of the device to the CPU 106 and the memory 102. The one or more processors 106 runs various software programs and/or sets of instructions stored in the memory 102 to perform various functions for the device 100 and to process data.

In some embodiments, the peripherals interface 108, the CPU 106, and the memory controller 104 may be implemented on a single chip, such as a chip 111. In some other embodiments, they may be implemented on separate chips.

The RF (radio frequency) circuitry 112 receives and sends electromagnetic waves. The RF circuitry 112 converts electrical signals to/from electromagnetic waves and communicates with communications networks and other communications devices via the electromagnetic waves. The RF circuitry 112 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 112 may communicate with the networks, such as the Internet, also referred to as the World Wide Web (WWW), an Intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), BLUETOOTH®, Wireless Fidelity (Wi-Fi) (e.g., IEEE 802.11ac, IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 114, the speaker 116, and the microphone 117 provide an audio interface between a user and the device 100. The audio circuitry 114 receives audio data from the peripherals interface 108, converts the audio data to an electrical signal, and transmits the electrical signal to the speaker 116. The speaker converts the electrical signal to human-audible sound waves. The audio circuitry 114 also receives electrical signals converted by the microphone 116 from sound waves. The audio circuitry 114 converts the electrical signal to audio data and transmits the audio data to the peripherals interface 108 for processing. Audio data may be may be retrieved from and/or transmitted to the memory 102 and/or the RF circuitry 112 by the peripherals interface 108. In some embodiments, the audio circuitry 114 also includes a headset jack (not shown). The headset jack provides an interface between the audio circuitry 114 and removable audio input/output peripherals, such as output-only headphones or a headset with both output (headphone for one or both ears) and input (microphone).

The camera circuitry 118 provides an interface to one or more cameras 119 between a user and the device 100. The camera circuitry 118 converts light into electrical signals for analysis, processing, storage, and/or display. The camera circuitry 118, in conjunction with the audio circuitry 114, can be configured to capture and record images and video. The camera circuitry 118 may include well-known components to accomplish this functionality including, for example and without limitation, one or more image sensors (e.g., CCD chips, CMOS chips, etc.), image sensor readout electronics, signal processing electronics, image processing electronics, optical circuits to control optical components to provide zooming and focusing functions, and the like.

The I/O subsystem 120 provides the interface between input/output peripherals on the device 100, such as the touch screen 126 and other input/control devices 128, and the peripherals interface 108. The I/O subsystem 120 includes a touch-screen controller 122 and one or more input controllers 124 for other input or control devices. The one or more input controllers 124 receive/send electrical signals from/to other input or control devices 128. The other input/control devices 128 may include physical buttons (e.g., push buttons, rocker buttons, capacitive touch buttons, etc.), dials, slider switches, sticks, and so forth.

The touch screen 126 provides both an output interface and an input interface between the device 100 and a user. The touch-screen controller 122 receives/sends electrical signals from/to the touch screen 126. The touch screen 126 displays visual output to the user. The visual output may include text, graphics, video, and any combination thereof. Some or all of the visual output may correspond to user-interface objects, further details of which are described below.

The touch screen 126 also accepts input from the user based on haptic and/or tactile contact. The touch screen 126 forms a touch-sensitive surface that accepts user input. The touch screen 126 and the touch screen controller 122 (along with any associated modules and/or sets of instructions in the memory 102) detects contact (and any movement or break of the contact) on the touch screen 126 and converts the detected contact into interaction with user-interface objects, such as one or more soft keys, that are displayed on the touch screen. In an exemplary embodiment, a point of contact between the touch screen 126 and the user corresponds to one or more digits of the user. The touch screen 126 may use LCD (liquid crystal display) technology, OLED (organic light-emitting diode) display technology, flexible OLED display technology, or LPD (light emitting polymer display) technology, although other display technologies may be used in other embodiments. The touch screen 126 and touch screen controller 122 may detect contact and any movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 126. The user may make contact with the touch screen 126 using any suitable object or appendage, such as a stylus, finger, and so forth.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 126 or an extension of the touch-sensitive surface formed by the touch screen 126.

The device 100 also includes a power system 130 for powering the various components. The power system 130 may include a power management system, one or more power sources (e.g., battery, alternating current (AC), solar power), a wireless recharging system, a conventional recharging system, a power failure detection circuit, a power converter or inverter, a power status indicator (e.g., a light-emitting diode (LED)) and any other components associated with the generation, management and distribution of power in portable devices.

In some embodiments, the software components include an operating system 132, a communication module (or set of instructions) 134, a contact/motion module (or set of instructions) 138, a graphics module (or set of instructions) 140, a user interface state module (or set of instructions) 144, and one or more applications (or set of instructions) 146.

The operating system 132 (e.g., iOS, ANDROID OS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 134 facilitates communication with other devices over one or more external ports 148 and also includes various software components for handling data received by the RF circuitry 112 and/or the external port 148. The external port 148 (e.g., Universal Serial Bus (USB), FIREWIRE, etc.) is adapted for coupling directly to other devices or indirectly over a network (e.g., the Internet, wireless LAN, etc.).

The contact/motion module 138 detects contact with the touch screen 126, in conjunction with the touch-screen controller 122. The contact/motion module 138 includes various software components for performing various operations related to detection of contact with the touch screen 122, such as determining if contact has occurred, determining if there is movement of the contact and tracking the movement across the touch screen, and determining if the contact has been broken (e.g., if the contact has ceased). Determining movement of the point of contact may include determining speed (magnitude), velocity (magnitude and direction), and/or an acceleration (including magnitude and/or direction) of the point of contact. In some embodiments, the contact/motion module 126 and the touch screen controller 122 also detects contact on the touchpad.

The graphics module 140 includes various known software components for rendering and displaying graphics on the touch screen 126. Note that the term "graphics" includes any object that can be displayed to a user, including without limitation text, web pages, icons (such as user-interface objects including soft keys), digital images, videos, animations and the like.

The user interface state module 144 controls the user interface state of the device 100. The user interface state module 144 may include a lock module 150 and an unlock module 152. The lock module 150 detects satisfaction of any of one or more conditions to transition the device 100 to a user-interface lock state and to transition the device 100 to the lock state. The unlock module 152 detects satisfaction of any of one or more conditions to transition the device 100 to a user-interface unlock state and to transition the device 100 to the unlock state. Further details regarding the user interface states are described below.

The one or more applications 146 can include any applications installed on the device 100, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player (which plays back recorded music stored in one or more files, such as MP3 or AAC files), etc.

In some embodiments, the device 100 is a device where operation of a predefined set of functions on the device is performed exclusively through the touch screen 126 and, if included on the device 100, the touchpad. By using the touch screen and touchpad as the primary input/control device for operation of the device 100, the number of physical input/control devices (such as push buttons, dials, and the like) on the device 100 may be reduced. In one embodiment, the device 100 includes the touch screen 126, the touchpad, a push button for powering the device on/off and locking the device, a volume adjustment rocker button and a slider switch for toggling ringer profiles. The push button may be used to turn the power on/off on the device by depressing the button and holding the button in the depressed state for a predefined time interval, or may be used to lock the device by depressing the button and releasing the button before the predefined time interval has elapsed. In an alternative embodiment, the device 100 also may accept verbal input for activation or deactivation of some functions through the microphone 117.

The predefined set of functions that are performed through the touch screen 126 and the touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

User Interface States

The device 100 may have a plurality of user interface states. A user interface state is a state in which the device 100 responds in a predefined manner to user input. In some embodiments, the plurality of user interface states includes a user-interface lock state and a user-interface unlock state. In some embodiments, the plurality of user interface states includes states for a plurality of applications.

In the user-interface lock state (hereinafter the "lock state"), the device 100 is powered on and operational but ignores most, if not all, user input. That is, the device 100 takes no action in response to user input and/or the device 100 is prevented from performing a predefined set of operations in response to the user input. The predefined set of operations may include navigation between user interfaces and activation or deactivation of a predefined set of functions. The lock state may be used to prevent unintentional or unauthorized use of the device 100 or activation or deactivation of functions on the device 100. When the device 100 is in the lock state, the device 100 may be said to be locked.

In some embodiments, the device 100 in the lock state may respond to a limited set of user inputs, including input that corresponds to an attempt to transition the device 100 to the user-interface unlock state or input that corresponds to powering the device 100 off. In other words, the locked device 100 responds to user input corresponding to attempts to transition the device 100 to the user-interface unlock state or powering the device 100 off, but does not respond to user input corresponding to attempts to navigate between user interfaces. It should be appreciated that even if the device 100 ignores a user input, the device 100 may still provide sensory feedback (such as visual, audio, or vibration feedback) to the user upon detection of the input to indicate that the input will be ignored.

In embodiments where the device 100 includes the touch screen 126, while the device 100 is locked, a predefined set of operations, such as navigation between user interfaces, is prevented from being performed in response to contact on the touch screen 126 when the device 100 is locked. In other words, when the contact is being ignored by the locked device 100, the touch screen 126 may be said to be locked. A locked device 100, however, may still respond to a limited class of contact on the touch screen 126. The limited class includes contact that is determined by the device 100 to correspond to an attempt to transition the device 100 to the user-interface unlock state.

In the user-interface unlock state (hereinafter the "unlock state"), the device 100 is in its normal operating state, detecting and responding to user input corresponding to interaction with the user interface. A device 100 that is in the unlock state may be described as an unlocked device 100. An unlocked device 100 detects and responds to user input for navigating between user interfaces, entry of data and activation or deactivation of functions. In embodiments where the device 100 includes the touch screen 126, the unlocked device 100 detects and responds to contact corresponding to navigation between user interfaces, entry of data and activation or deactivation of functions through the touch screen 126.

Example Method of Unlocking a Portable Electronic Device

Figure 2:
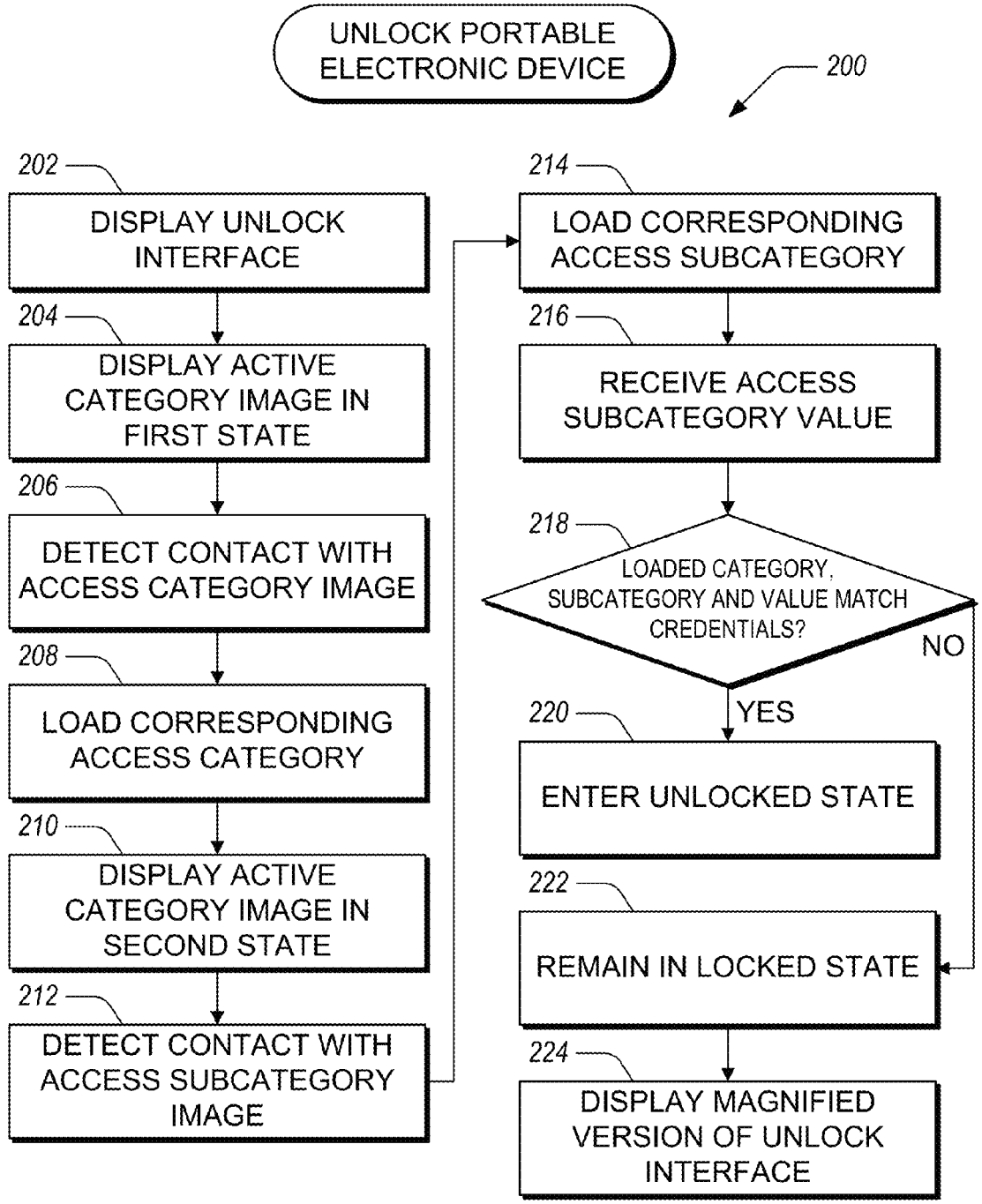
FIG. 2 illustrates a flow chart of a method for unlocking a portable electronic device.

FIG. 2 is a flow chart illustrating an example method 200 for transitioning a device to a user-interface unlock state. As used herein, transitioning from one state to another refers to the process of going from one state to another. The process may be, as perceived by the user, instantaneous, near-instantaneous, gradual, or at any suitable rate. The progression of the process may be controlled automatically by the device, such as the device 100 (FIG. 1), independent of the user, once the process is activated; or it may be controlled by the user. While the method 200 described below includes a number of operations that appear to occur in a specific order, it should be apparent that these processes may include more or fewer operations, which may be executed serially or in parallel (e.g., using parallel processors or a multi-threading environment).

Generally, the method 200 includes a multi-step authentication process to unlock the device, the multi-step process including receiving access credentials and comparing the received access credentials to stored access credentials. To unlock the device, for example, a user can use the touch screen to select an access category, to select an access subcategory, and to enter an access subcategory value. In response to user interaction with the touch screen, the device can load a corresponding access category and access subcategory from memory as well as receive an access subcategory value. The loaded/received access credentials can then be compared to stored access credentials to determine whether to authorize access. The access category and the access subcategory are logically related pieces of information (e.g., as category and subcategory) and the access subcategory value is a particular value corresponding to the access category and access subcategory. For example and without limitation, access categories can include radio station, professional sports team, television show, arts awards, or the like.

The access subcategory can depend on the access category, making them logically related. In some implementations, each unique access category can have one or more unique access subcategories associated with it. In certain implementations, if an access subcategory in a first access category has an identical or similar name to an access subcategory in a second access category, the respective access subcategories can indicate different access subcategory value responses. For example, the access category "radio station" and the access category "TV show" may each have an access subcategory "genre." However, the access subcategory "genre" for the access category "radio station" indicates a genre of music (e.g., rock, classical, pop, R&B, etc.) while for the access category "TV show" it indicates a genre of television show (e.g., drama, comedy, mystery, documentary, etc.).

As used herein, an access category and an access subcategory are logically related pieces of information where they are conceptually or logically connected to one another, so that together they provide a suitable or well-defined prompt for information in the form of the access subcategory value. In addition, the access category and the access subcategory are logically related in that the access category provides an indication of an area of information to be provided and the access subcategory narrows the scope of possible values within that area of information. For example, where the selected access category is a radio station, the access subcategory can be a city or a station call number. Together, the access category and access subcategory indicate a particular piece of information to be entered as the access subcategory value. The access subcategory value can be a value that corresponds to the selected access category and subcategory. For example, where the selected access category is a radio station and the selected access subcategory is a station call number, the access subcategory value can be "103.5," corresponding to a station call number for a particular radio station. For the purpose of illustration, access subcategories for the "professional sports team" access category can include a player jersey number or a team name, access subcategories for the "television shows" access category can include a cast name or a show season number, access subcategories for the "arts awards" access category can include an album name or an award year. In certain implementations, one access subcategory value can be an alpha-numeric value and one access subcategory value can be a numeric value. In some embodiments, an unlock interface can use similar text, graphics, and/or colors on access category images and access subcategory images to indicate a relationship between access categories and access subcategories. For example, if a user selects an access category corresponding to a "radio station," an antenna tower can be shown as part of the access subcategory image. In certain implementations, the unlock interface does not include indicators on the access category images or the access subcategory images to indicate any relationships between access categories and access subcategories.

In certain implementations, the access credentials can be organized as sets. For example, multiple sets can be defined where each set has a name. The name of the set is related to the members or elements of the set in that each element of the set expresses a quality that directly relates to the name of the set or each element of the set narrows or indicates a particular area of information within a category of information indicated by the name of the set. In that sense, the name of the set and the members of the set are logically related pieces of information. For example and without limitation, the access credentials can include a set named "radio station" with the elements including "city," "station number," "country," "genre," "call letters," "state," or the like. The access credentials can then include a name of the set, an element of the set, and a value corresponding to the element of the set.

In some implementations, access categories and access subcategories can be stored in a configuration database. For example, the configuration database can be stored on a portable electronic device. The access categories and access subcategories can be pre-loaded onto the device into the configuration database. In certain implementations, access categories and access subcategories can be updated, added, revised, deleted, or the like. For example, access categories and/or access subcategories can be downloaded from a server or other remote computer, purchased from a web-based service, purchased within an application on the device, received or updated as part of a subscription service, or the like. This can advantageously allow the access credentials to change from time-to-time (e.g., periodically, in response to a user request, in response to a predetermined event, etc.), thereby increasing security of the authentication or unlocking process.

The multi-step authentication or unlocking process can advantageously be easy to remember because the pieces of information to be provided (e.g., the correct access category, the correct access subcategory, and the correct access subcategory value) are logically related to one another. In addition, the multi-step authentication or unlocking process can be difficult to guess as each step in the process decreases the chances an unwanted person or system correctly guesses the correct values for each step. And, as described in greater detail herein with reference to FIGS. 3E and 4B, further actions can be taken by the device to decrease the chances the correct sequence is guessed. As an example, the unlock interface displayed by the device can be configured to not display a visual indication of which access category has been loaded in response to user interaction with the touch screen. This reduces the probability that an onlooker will learn the correct access category, for example.

In block 202, a device in a lock state displays an unlock interface. The unlock interface can be similar to the interfaces described herein with reference to FIGS. 3A-6B. The device may be set (that is, transition completely to the lock state from any other state) to the locked state upon satisfaction of any of one or more lock conditions. The lock conditions may include events such as the elapsing of a predefined time of inactivity, entry into an active call, or powering on the device. The lock conditions may also include user intervention, namely the user locking the device by a predefined user input. In some embodiments, the user may be allowed to specify the events that serve as lock conditions. For example, the user may configure the device to transition to the lock state upon the elapsing of a predefined time of inactivity but not upon powering on the device. The locked device, when not displaying the unlock interface, may power down the touch screen (which helps to conserve power) or display other objects on the touch screen, such as a screen saver or information that may be of interest to the user (e.g., battery charge remaining, date and time, network strength, etc.).

Figure 3A:
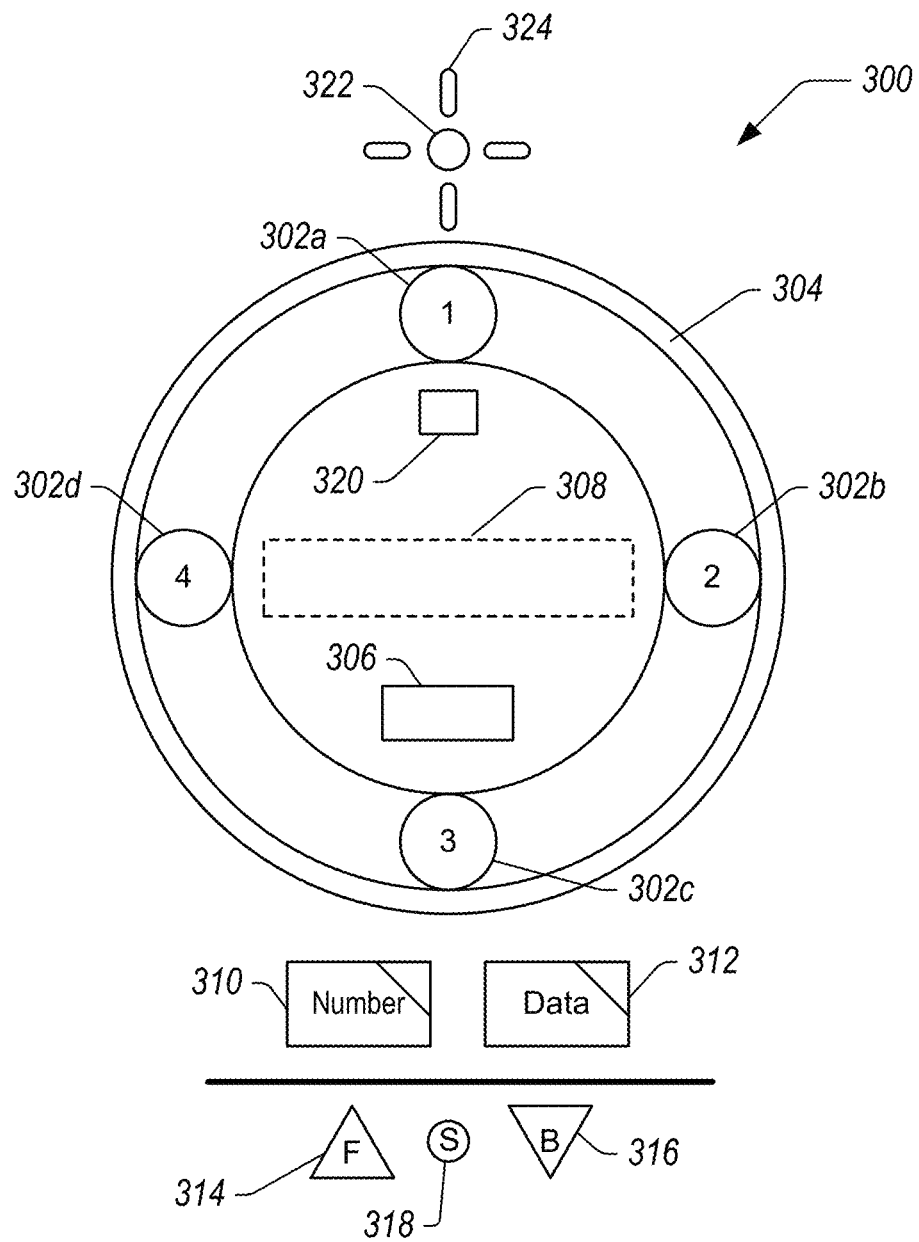
FIGS. 3A-3E illustrate examples of unlock interfaces in various states during an authentication process.

The unlock interface can include a number of graphical, interactive user-interface objects with which a user may interact. FIG. 3A illustrates an example unlock interface 300 that includes a plurality of access category images 302a-d corresponding to access categories, an active category image 304, an access subcategory image 306, and an access subcategory value image 308. The active category image 304 can be a graphical object that has two states, a first state prior to interaction with an access category image 302a-302d and a second state to indicate interaction with an access category image 302a-302d. The active category image 304 is illustrated in the first state in FIG. 3A and in the second state in FIG. 3B to indicate that an access category has been loaded (e.g., in response to interaction with an access category image). The access subcategory value image 308 can be a graphical object configured to display information corresponding to a received subcategory value.

Returning to FIG. 2, in block 204, the device displays on the touch screen the active category image in the first state. This is used to indicate that an access category has not yet been loaded or selected. This or other similar visual cues can be used to indicate to the user the current stage of the multi-step authentication process. By having such a visual cue, the device can avoid the use of indicia that may indicate the correct authentication credentials to another person (e.g., a person wishing to gain unauthorized access to the device by surreptitiously watching the user unlock the device). For example, the active category image can be used to in place of using the access category images to indicate that a category has been loaded or selected.

In block 206, the device detects contact with one of the plurality of access category images of the unlock interface. For ease of explanation, contact on the touch screen in the method 200 and in other embodiments described herein is described as performed by the user using at least one hand using one or more fingers. However, it should be appreciated that the contact may be made using any suitable object or appendage, such as a stylus, finger, etc. The contact may include one or more taps on the touch screen, maintaining continuous contact with the touch screen, movement of the point of contact while maintaining continuous contact, a breaking of the contact, or any combination thereof.

The device detects the contact on the touch screen. If the contact does not correspond to an attempt to perform a predefined action in the unlock sequence, or if the contact corresponds to a failed or aborted attempt by the user to perform a predefined action in the unlock sequence, then the device remains locked. For example, if the detected contact is not on one of the access category images or other graphical object, then the device can ignore the contact and remain in the locked state.

FIG. 3A illustrates an example unlock interface 300 having a plurality of access category images 302a-302d. When a user contacts the user interface 300 at or near one of the plurality of access category images 302a-302d, the device can register the touch as contact with a particular access category image. In some embodiments, the access category images 302a-302d are graphical objects that can include text, such as numbers, or that can be colored differently, have different shapes, or any combination of these. Each access category image 302a-302d can be differentiated from the others through the use of graphical means. This can make it easier for a user to remember which access category to select.

Returning to FIG. 2, in block 208, the device loads an access category from memory corresponding to the access category image contacted in block 206. The access category can be, for example and without limitation, a radio station, a television show, a team in a sport, an award from the arts, or the like. The category corresponding to the loaded access category can be hidden from a user. For example, no visual indication can be provided by default to indicate the loaded access category. In some embodiments, the user can interact with the unlock interface to see which access category has been loaded. For example, with reference to FIG. 3B, the user can contact a combination of graphical objects 314, 316, 318, etc. and in response to the detected contact the device can display the category of the loaded access category on the unlock interface 300 (e.g., in the access subcategory image 306).

Returning to FIG. 2, in block 210, the device displays the active category image in the second state to indicate that an access category has been loaded. In certain implementations, to increase security, the touch screen of the device does not indicate which access category has been loaded or selected. However, to indicate that an access category has been loaded, the active category image can change states. This change in states can indicate to a user that an access category has been loaded without indicating which access category was loaded. In some implementations, the active category image can provide information about whether an access category has been loaded and which category has been loaded using different colors, text, shapes, or the like. For example, the access category image can include text, graphics, or colors and the access subcategory image or active category image can change to include the text, graphics, or colors that correspond to the loaded access category image.

Figure 3B:
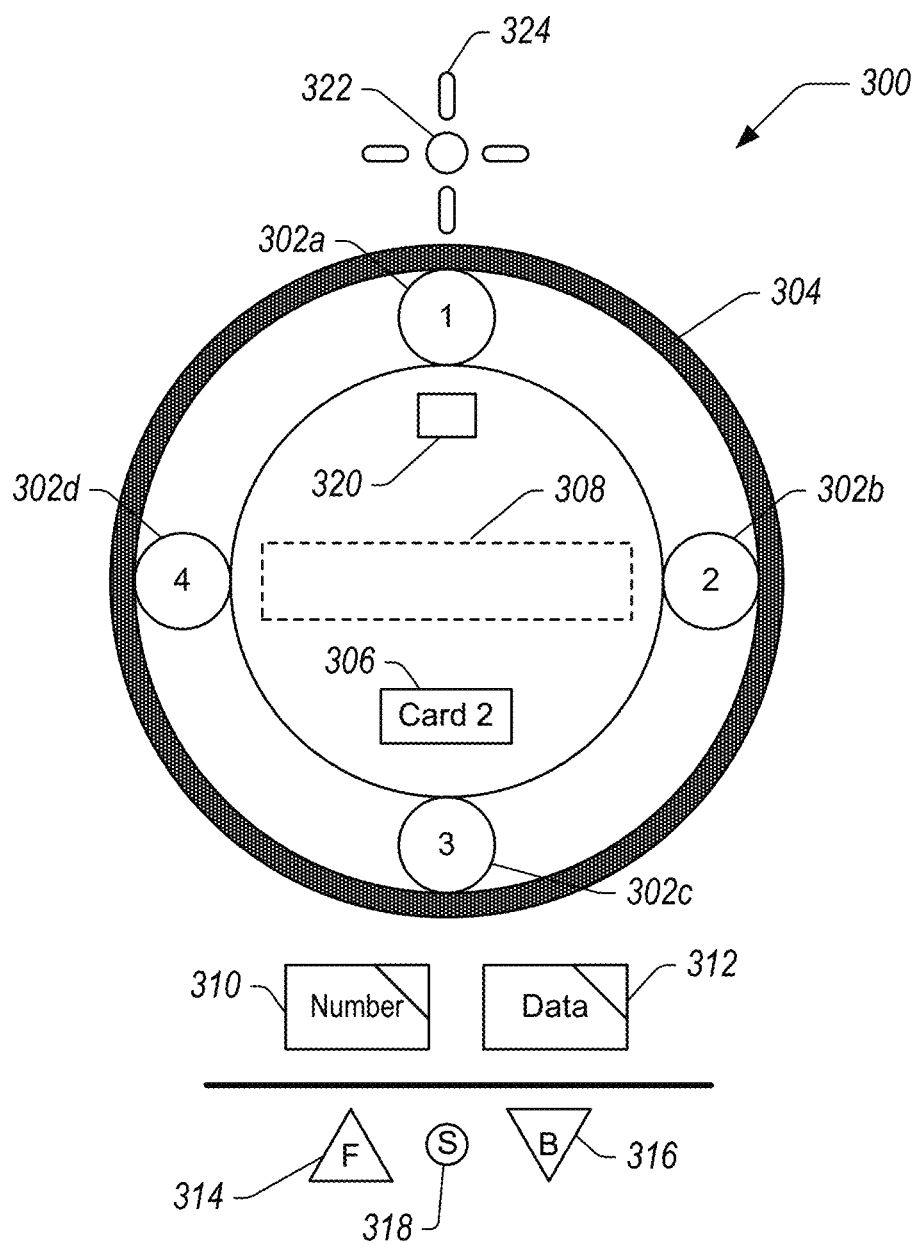

For example, with reference to FIG. 3B, after the device loads an access category in response to detected interaction with one of the access category images 302a-302d, the active category image 304 changes states (e.g., changes from one color to another color, changes from a static image to an animated image, changes brightness, changes size, changes an outline, etc.) to indicate loading of an access category. As illustrated, the access category images 302a-302d remain the same so as to not indicate which access category has been loaded.

Returning to FIG. 2, in block 212, the device detects contact with an access subcategory image of the unlock interface. In some embodiments, the access subcategory image can be an image that changes periodically, that changes in response to interaction with other graphical objects on the unlock interface, that provides a way to select a particular access subcategory such as with a drop-down menu, or the like. In certain implementations, the unlock interface includes a plurality of access subcategory images, similar to the access category images. For example, where the access category images are presented around a circle, the access subcategory images can be presented around a smaller or larger concentric circle. Other configurations of access category images and access subcategory images are possible as well.

FIG. 3B illustrates an example unlock interface 300 that shows an access subcategory image 306. In the example, the access subcategory image 306 is a graphical object with textual content to indicate a particular access subcategory. The text "Card 2" in the access subcategory image 306 can be replaced with suitable values based at least in part on the access category loaded in block 208 of the method 200. The text displayed in the subcategory image 306 can change, as described herein. For example, text or images displayed as part of the subcategory image 306 can change, cycling through a finite set of loadable subcategories. The unlock interface 300 can include a forward arrow 314 and a back arrow 316 that are respectively configured to command the device to scroll through available access subcategories in the access subcategory image 306. The unlock interface 300 can include a shuffle graphical object 318 configured to command the device to initiate an automatic scroll through available access subcategories in the access subcategory image 306. In certain implementations, if the device detects contact with both the shuffle graphical object 318 and the forward arrow 314, the device displays the first available access subcategory in the access subcategory image 306. Similarly, if the device detects contact with both the shuffle graphical object 318 and the back arrow 316, the device displays the last available access subcategory in the access subcategory image 306.

Returning to FIG. 2, in block 214, the device loads an access subcategory from memory corresponding to the access subcategory image contacted in block 212. In some implementations, where the access subcategory image changes periodically or in response to interaction with other graphical objects on the unlock interface, the loaded access subcategory corresponds to the access subcategory image displayed at the time of detected contact with the access subcategory image.

The access subcategories are related to the loaded access category. In addition, there are dummy subcategories that are presented that do not correspond to an authorized subcategory for unlocking the device. In certain implementations, a plurality of authorized subcategories can be included with a plurality of unauthorized subcategories to reduce the likelihood that an unwanted person can gain access to the device. TABLE 1 includes examples of access categories and associated access subcategories where authorized subcategories are underlined and other subcategories are dummy subcategories. Other suitable access categories and associated subcategories can be used.

TABLE 1

|  | Category 1: Radio Stations | Category 2: TV Shows | Category 3: Sports Teams | Category 4: Arts Awards |
| --- | --- | --- | --- | --- |
| Subcategory 1 | Call Letters | Actor Name | Jersey Number | Album Name |
| Subcategory 2 | City | Character Name | Player Name | Genre |
| Subcategory 3 | Country | Show Channel | Player Position | Artist Name |
| Subcategory 4 | Genre | Show Genre | Team City | Inductee Year |
| Subcategory 5 | State | Show Name | Team Name | Group Name |
| Subcategory 6 | Station Number | Season Number | Team State | Grammies Won |

In block 216, the device receives input for the access subcategory value at an input object on the unlock interface. The access subcategory value corresponds to an entry for the loaded access subcategory within the loaded access category. The access subcategory value can be an alphanumeric value or a numeric value. The access subcategory value can be input by a user using a number of different methods including a keyboard, a soft keyboard, voice, or through the use of another sensor (e.g., pressure sensor, accelerometer, etc.).

Figure 3C:
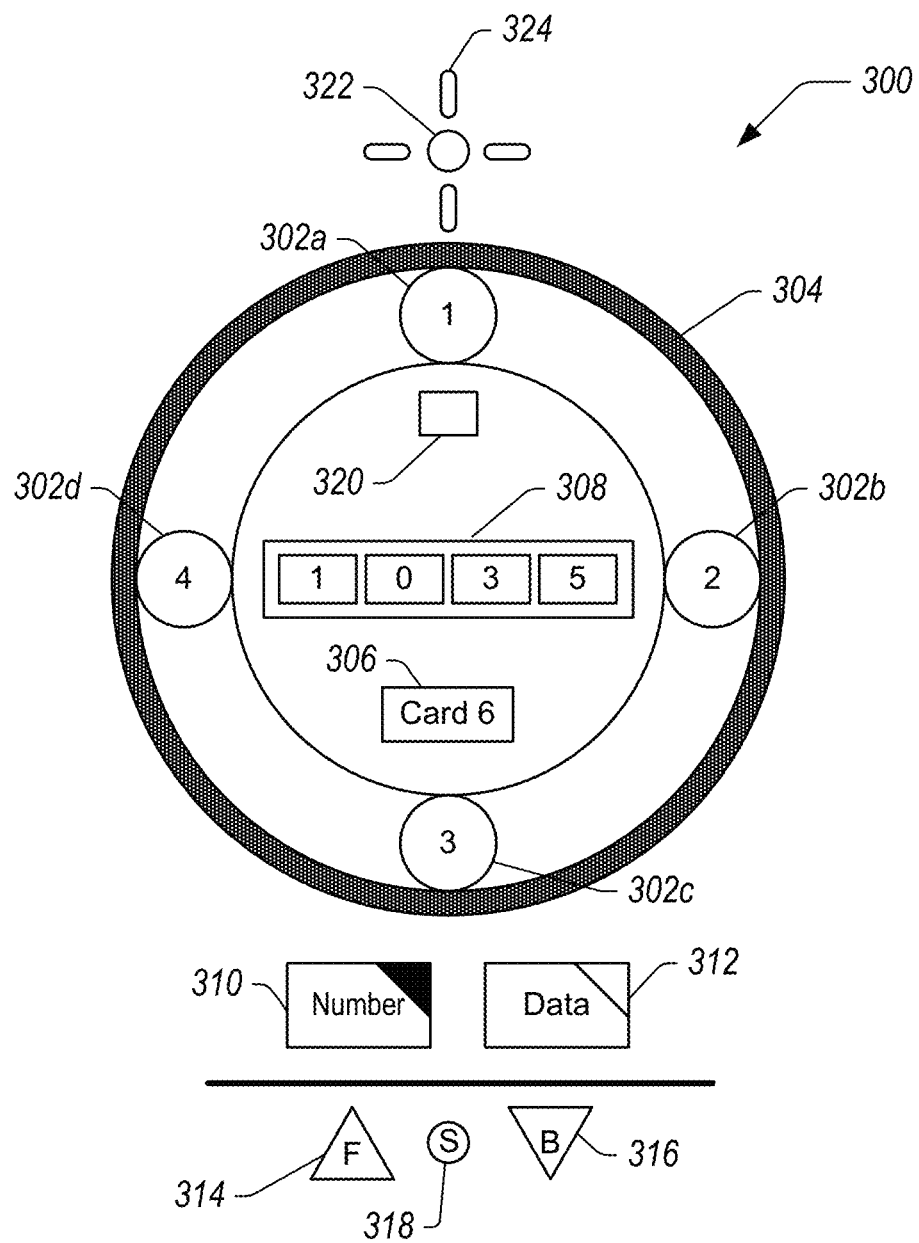
Figure 3D:
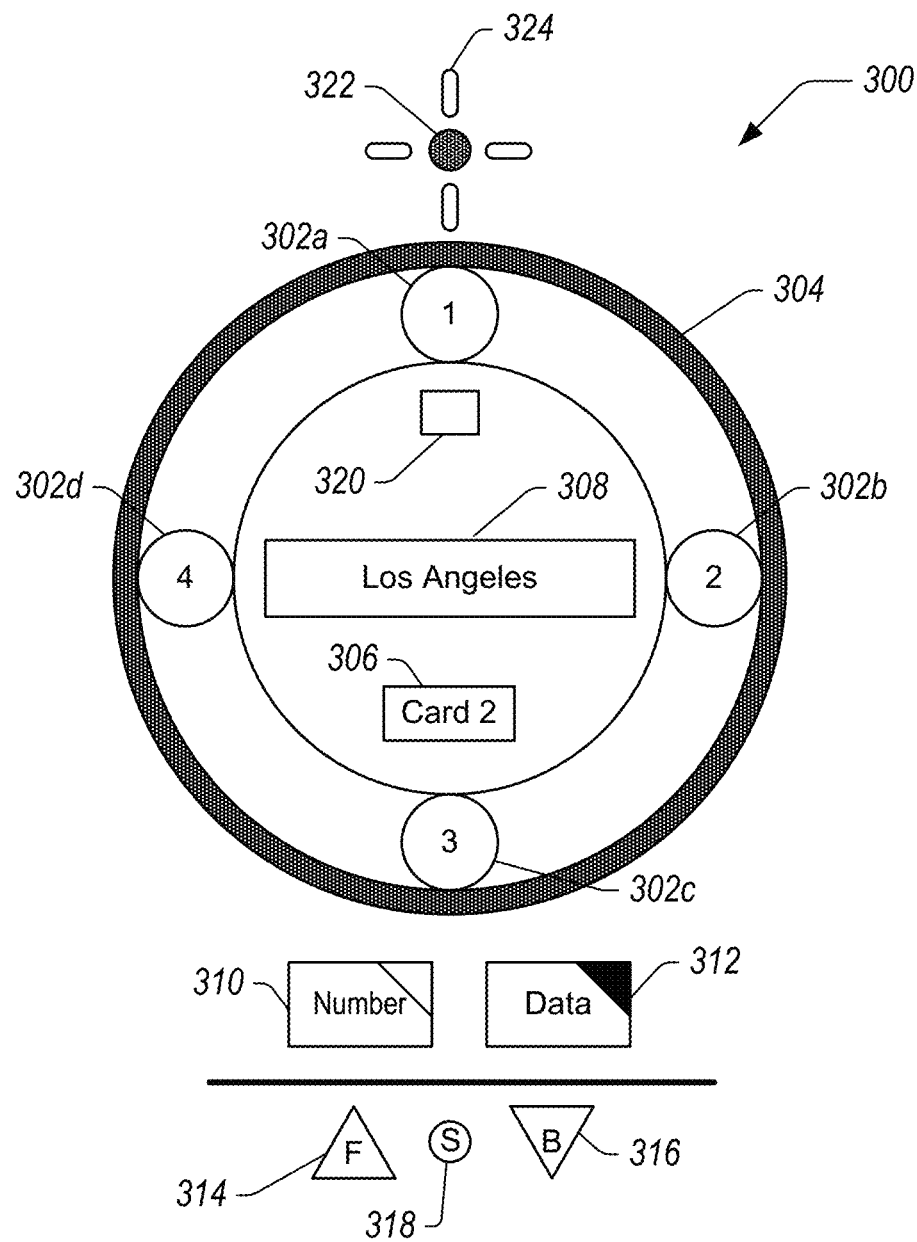

FIG. 3C illustrates an example unlock interface 300 where an access category has been loaded, as indicated by the active category image 304, and where an access subcategory has been loaded. Loading of the access subcategory can be indicated by an indicator on a number graphical object 310. The number graphical object 310 can be hidden during previous steps in the authentication process and may appear when the access subcategory has been loaded or selected. The number graphical object 310 can appear and can include an additional indicator (e.g., the triangular indicator) when an access subcategory has been loaded that expects a numeric input. Similarly, as illustrated in FIG. 3D, a data graphical object 312 can appear and can include an additional indicator (e.g., the triangular indicator) when an access subcategory has been loaded that expects an alphanumeric input.

In some embodiments, the authentication process can require that at least one alphanumeric access subcategory value be entered as well as at least one numeric access subcategory value be entered. This may be illustrated by an example that references the values shown in the figures as well as information from TABLE 1. If the access category, for example, is "radio stations," then the authentication process can require at least one access subcategory be provided that expects a numeric entry (e.g., the "Station Number" subcategory) as well as at least one access subcategory that expects an alphanumeric entry (e.g., the "City" subcategory). From the point of view of a user of a device, a successful unlocking process would thus include selection of the "radio station" category, selection of the "station number" subcategory, entry of the correct or expected station number, selection of the "city" subcategory, and entry of the correct or expected city. In certain embodiments, to indicate that at least one access subcategory value has been received or entered, the value entry indicator 322 can change from a first state (e.g., as illustrated in FIG. 3C) to a second state (e.g., as illustrated in FIG. 3D). This can help a user to keep track of the stages of the multi-step authentication process.

Returning to FIG. 2, in block 218, the device compares the loaded access category, the loaded access subcategory(ies), and the received access subcategory value(s) to stored access credentials. The stored access credentials can include one or more access categories, one or more access subcategories for each of the one or more access categories, and an access subcategory value for each access subcategory. The stored access credentials can be configured by the user in a separate process. The stored access credentials can be selected by a user where the user selects credentials that are easy to remember because the credentials are associated with information personal to the user (e.g., a user's favorite radio station, TV show, sports team, artist, etc.). The multi-stage authentication process, however, can make the credentials difficult to guess due at least in part to the multiple entries required and the multiple stages in the process.

If the entered information matches the stored access credentials, the device transitions to the unlocked state in block 220. The device can require that all of the access credentials be provided during the unlock process 200. For example, the stored access credentials can include a plurality of access categories, a plurality of access subcategories for each access category, and a single access subcategory value for each of the plurality of access subcategories. To satisfy the authentication process, then, the device can require that each access category be selected as well as each of the associated access subcategories and the corresponding access subcategory values. The number of access categories to be required in the authentication process can be associated with a level of difficulty configured by the user. For example, a beginning level authentication can require one access category, an intermediate level authentication can require two access categories, an advanced level authentication can require three access categories, and an expert level authentication can require four or more access categories.

Satisfaction of the unlocking process unlocks the device. While the device is unlocked, the device may display on the touch screen user-interface objects corresponding to one or more functions of the device and/or information that may be of interest to the user. The user-interface objects are objects that make up the user interface of the device and may include, without limitation, text, images, icons, soft keys (or "virtual buttons"), pull-down menus, radio buttons, check boxes, selectable lists, and so forth. The displayed user-interface objects may include non-interactive objects that convey information or contribute to the look and feel of the user interface, interactive objects with which the user may interact, or any combination thereof. The user may interact with the user-interface objects by making contact with the touch screen at one or more touch screen locations corresponding to the interactive objects with which she wishes to interact. The device detects the contact and responds to the detected contact by performing the operation(s) corresponding to the interaction with the interactive object(s).

If the entered information does not match the stored access credentials, the device remains in the locked state in block 222. The device can remain in the locked state if at least one piece of information does not match the stored access credentials. While the device is locked, the user may still make contact on the touch screen. However, the locked device is prevented from performing a predefined set of actions in response to any detected contact until the device is unlocked. The prevented predefined set of action may include navigating between user interfaces and entry of data by the user.

In block 224, the device displays a magnified version of the unlock interface in response to incorrect credentials being entered. For each incorrect credential, a magnification can be aggregated to a total magnification. The total magnification can be used to generate a magnified version of the unlock interface to indicate that one or more incorrect credentials have been entered and to increase the difficulty of performing the authentication process. The magnified unlock interface can be configured to be static in position and size (e.g., the unlock interface can be configured to not allow zooming and/or panning of the interface).

Figure 4A:
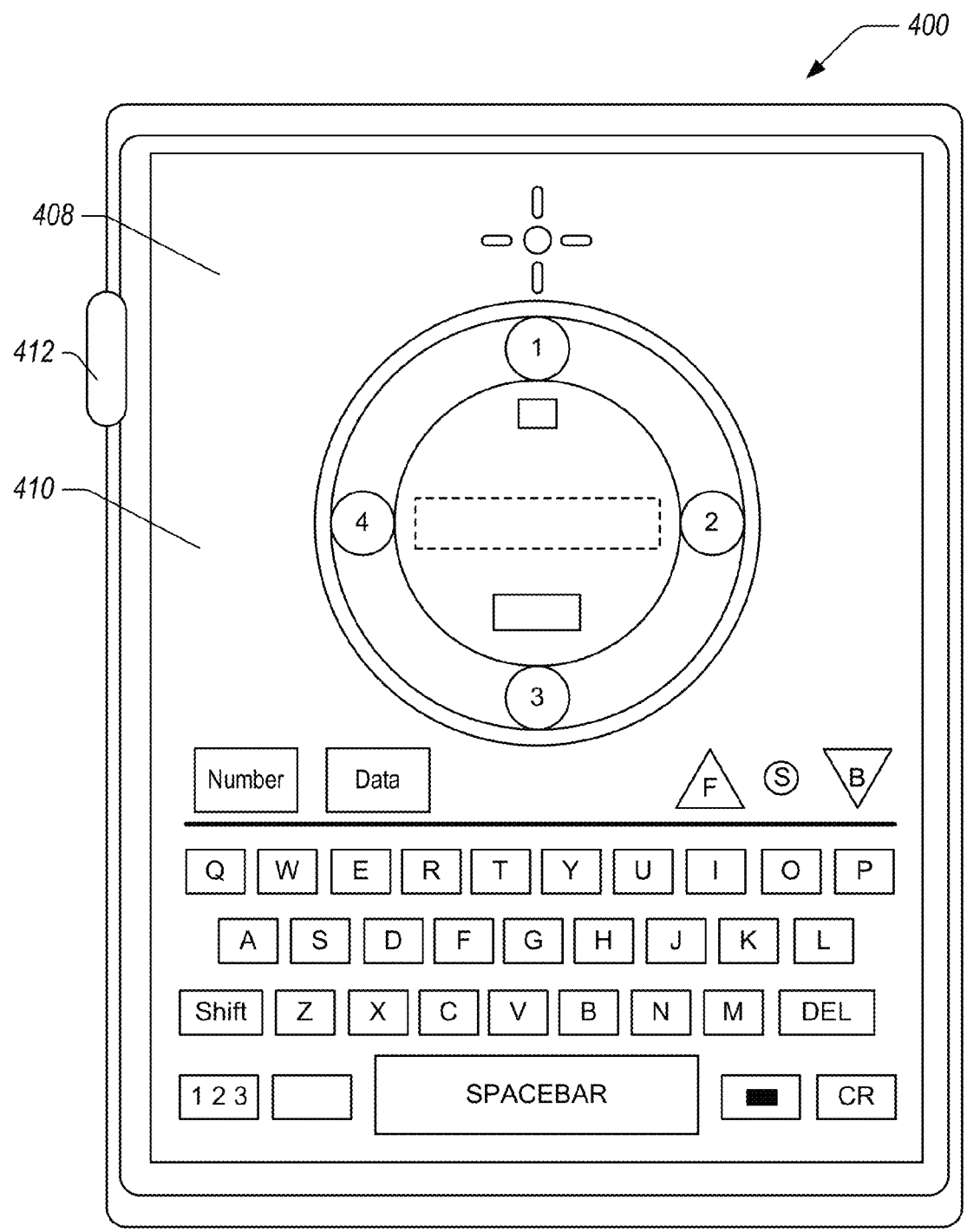
FIGS. 4A-4B illustrate an example device displaying an example unlock interface prior to magnification in FIG. 4A and after magnification in FIG. 4B.
Figure 4B:
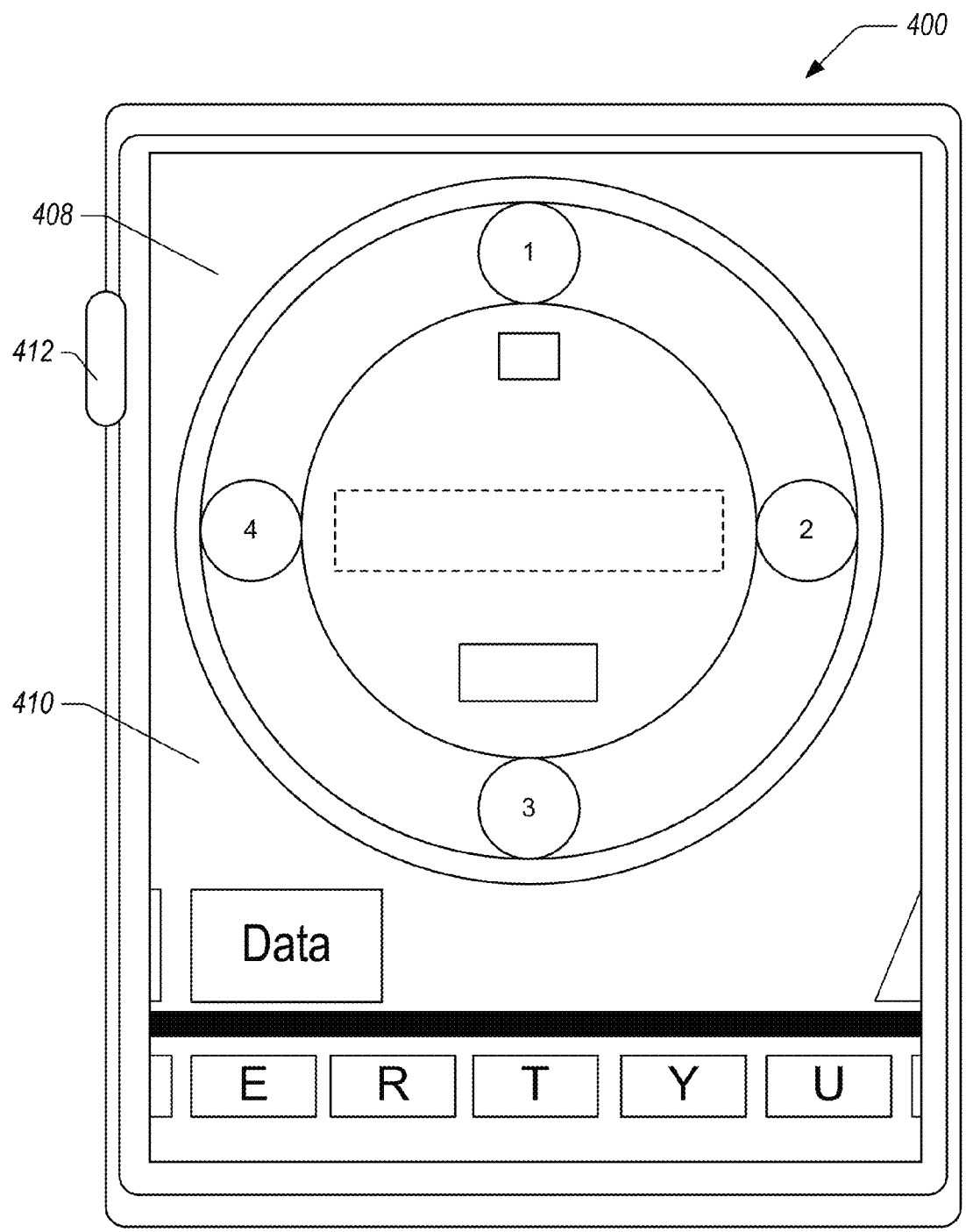

FIGS. 4A and 4B illustrate an example device 400 with an unlock interface 410. In FIG. 4A, the unlock interface 410 is displayed in its un-magnified state. After entry of incorrect credentials, a magnified version of the unlock interface 410 is presented. As can be seen from FIG. 4B, the magnified version of the unlock interface 410 can make it difficult, impractical, and/or impossible to further perform the authentication process. For example, the device 400 can prevent zooming, swiping, sliding, scrolling, etc. of the magnified version of the unlock interface 410 and/or other touch-screen interactions. In particular, the device 400 can be configured to not respond to touch-screen gestures that typically (e.g., during normal operation of the device 400) correspond to moving a position of an interface on a display (e.g., using gestures to swipe or scroll the displayed interface) or to change a zoom factor of an interface on a display (e.g., using gestures to zoom in or out of the displayed interface). This can effectively prevent a user from accessing one or more elements of the unlock interface 410. The level of magnification can be related to the incorrect credentials entered during the authentication process. Each incorrect entry can contribute to the total magnification. Different magnifications can be assigned to different credentials. For example, an incorrect access category can contribute more to the final magnification than an incorrect access subcategory, and an incorrect access subcategory can contribute more to the final magnification than an incorrect access subcategory value. By magnifying the unlock interface at the end of the authentication process, the user may not be aware of which entered credential was incorrect. This may be advantageous where a person is trying to gain unauthorized access to the device, as the unlock process does not provide feedback to the user as to which credentials are incorrect.

Figure 5:
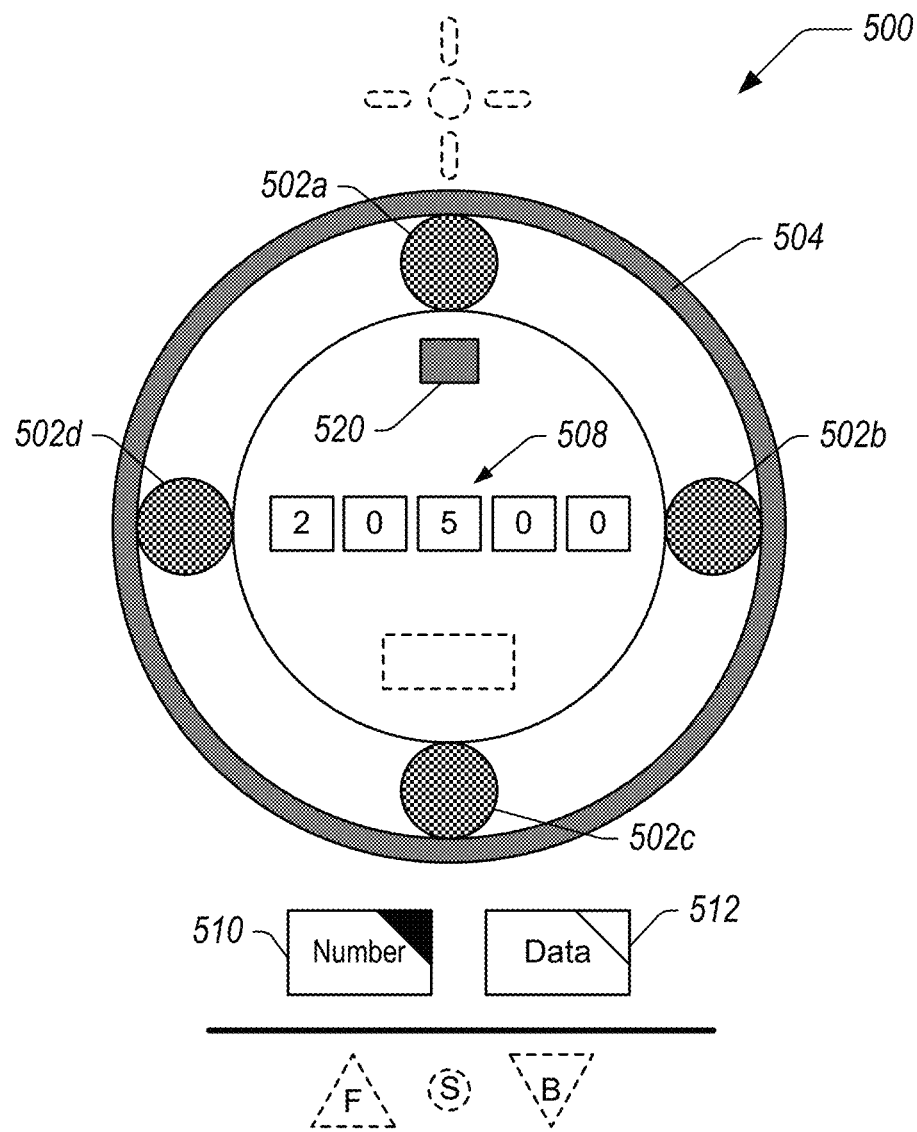
FIG. 5 illustrates an example security violation screen interface.

If the magnification of the unlock interface is so great as to make it impossible to perform the authentication process, the user may have to power off the portable electronic device. When the device is powered back on, a security violation interface can be displayed. An example of a security violation interface 500 is illustrated in FIG. 5. The security violation interface 500 can be similar to the unlock interface 300 described herein with reference to FIGS. 3A-3E, but can have one or more elements invisible, dimmed, or otherwise de-emphasized. The security violation interface 500 can indicate a security violation with a security violation indicator 520. The security violation indicator 520 can be in a first state where there is not security violation, such as the security violation indicator 320 illustrated in FIGS. 3A-3E, and can be in a second state where there is a security violation, as illustrated in FIG. 5. To exit the security violation interface 500, a secure password or identification can be entered using the number graphics object 510 and/or the data graphics object 512. The code can be displayed in plain text in the security violation value object 508 or it can be displayed in such a way as to obscure the value entered (e.g., using asterisks in place of the entered characters). If the correct security value is entered, the device can enter the locked state and display the unlock interface.

Accordingly, some embodiments disclosed herein provide an authentication process that allows an open-ended number of tries. This is accomplished due at least in part to the magnification of the unlock interface. Because the amount of magnification depends at least in part on which entered credentials are incorrect, the resulting magnification can be different for each failed attempt. The device analyzes the input credentials (e.g., the selected access category, the selected access subcategory, the access subcategory value), determines differences between the input credentials and the correct access credentials, and determines a magnification amount based on those differences. The amount of magnification may be small so that the unlock interface is still usable. The magnified unlock interface can be a signal to the user that the attempt to unlock the device was unsuccessful.

Using the magnified unlock interface, the user can attempt to unlock the device again. An unsuccessful attempt can result in an additional magnification on top of the previous magnification. Again, the unlock interface may still be usable to attempt to perform the authorization process and the user may try again. After a number of failed attempts, the magnification may become so large as to render the unlock interface unusable for the purposes of performing the authorization process. A maximum number of failed attempts, however, may not be set by the device. It may be a practical result of magnifying the screen. Accordingly, the device allows an open-ended number of tries to access the device but effectively limits the number of tries through magnification of the unlock interface.

In some embodiments, the device uses a scoring system to limit the number of sequential unsuccessful attempts to access the device. The scoring system can score incorrect entries based at least in part on which access credentials are incorrect and/or the differences between received credentials and the correct credentials. In this way, the device can effectively allow fewer attempts to access the device where input credentials contain more differences from the correct credentials relative to input credentials that contain fewer differences from the correct credentials.

The magnification amount and/or the scoring system can weight incorrect entries differently depending on the particular access credential. For example, the device can give a larger weight (e.g., a larger score, a higher magnification, etc.) to an incorrect access category than to an incorrect access subcategory. As another example, the device can give a larger weight to an incorrect access subcategory than to an incorrect access subcategory value. In certain implementations, the device can analyze differences between a received access subcategory value and the correct access subcategory value to determine differences between them. Where there are minor differences (e.g., a typographical error switching letters between the entered value and the correct value), the weight can be smaller than for a received value that has more differences (e.g., no letters or numbers in common).

In some embodiments, the device uses data from previous attempts to access the device to determine a magnification amount and/or a score. By comparing a current failed attempt to access the device to previous failed attempts, the device can determine a probability that the unsuccessful attempt is by an authorized user who merely made a mistake during the authorization process or whether the attempt is by an unauthorized user attempting to guess the correct credentials. For example, where an authorized user routinely misspells the correct access subcategory value, the resulting magnification or score can be small compared to an incorrect access subcategory because the user rarely enters the incorrect access subcategory. The device can classify an unsuccessful attempt as an unsuccessful attempt by an authorized user where that unsuccessful attempt was immediately followed by a successful attempt or where a successful attempt occurred within a predefined time limit from the unsuccessful attempt (e.g., within 3 minutes, within 1 minute, within 30 seconds, within 15 seconds, etc.).

Accordingly, some embodiments disclosed herein provide an authentication process that presents a different authorization or unlock interface after one or more failed attempts to access the device. As described herein, the device can be configured to display a magnified unlock interface after an unsuccessful attempt to access the device. If the magnification of the unlock interface becomes large enough after one or more failed attempts, the unlock interface may become unusable for the purpose of completing the authorization process. The device can be configured to require the device to be powered off to reset the unlock interface magnification. However, the device can also be configured to present a different authorization screen after powering back on. The device can be configured to present this different authorization screen where the device was powered off at a time when the unlock interface was in a magnified state. In this way, the device can effectively provide an additional layer of security so that an unauthorized user is required to supply additional authorization credentials before being allowed to attempt to access the device through the usual authorization process. An example of this different authorization screen is described herein with reference to FIG. 5.

In some embodiments, in addition to visual feedback, the electronic device supplies non-visual feedback to indicate progress towards completion of the unlock process. In some embodiments, in addition to visual feedback, the electronic device supplies non-visual feedback to indicate completion of the unlock process. The additional feedback may include audible feedback (e.g., sound(s)) or physical feedback (e.g., vibration(s)).

Example Unlock Interfaces

As described above, FIGS. 3A-3E illustrate examples of an unlock interface 300 in various states of an authentication procedure. In some embodiments, the device is initially in sleep mode and/or displays a dark screen, and the device displays the unlock interface 300 when touched, as illustrated in FIG. 3A. The user touches the touch screen at one of the locations corresponding to the access category images 302a-302d to select an access category. The appearance of the category images 302a-302d can provide information to the user as to the access category associated with the image. For example, the user can know or remember that access category image 302a displays a "1" that corresponds with the category "radio station." The contact with the access category image, either overlapping with the access category image 302a, 302b, 302c, or 302d or in proximity to the access category image 302a, 302b, 302c, or 302d, is detected by the device and is determined to be an attempt to unlock the touch screen, based on the fact that the user is interacting with an access category image 302a, 302b, 302c, or 302d.

After contacting an access category image, the unlock interface displays the active category image 304 in the second state to indicate that the access category has been loaded, as illustrated in FIG. 3B. The access subcategory image 306 can display values or images corresponding to access subcategories that correspond to the loaded access category. The user can contact the access subcategory image 306 when the desired or targeted access subcategory is displayed (or a corresponding image is displayed) to indicate selection of the corresponding access subcategory. The device can detect contact with forward or back arrows 314, 316 or shuffle graphical object 318, to change which access subcategory image 306 is displayed.

After contacting the access subcategory image 306, the access subcategory value object 308 can appear or receive focus to indicate that an access subcategory has been loaded, as illustrated in FIG. 3C or 3D. The device can then detect contact with the number graphical object 310 or the data graphical object 312 to indicate selection of alphanumeric entry or numeric entry. In some implementations, the device can include this selection in the stored access credentials. Thus, an incorrect selection at this point can increase the level of magnification of the unlock interface after the unsuccessful authentication process. The unlock interface 300 can indicate which data entry object has been loaded (e.g., the black triangular indicator on the number graphical object 310 in FIG. 3C or on the data graphical object 312 in FIG. 3D). Contact with the number graphical object 310 or the data graphical object 312 triggers actions that allow entry of an access subcategory value, which can be displayed in the access subcategory value object 308. For example, the device can display on the unlock interface a numerical keyboard in response to detected contact with the number graphical object 310. Similarly, the device can display on the unlock interface an alphanumeric keyboard in response to detected contact with the data graphical object 312.

In some embodiments, the device requires a plurality of access subcategories for each loaded or selected access category. In certain implementations, at least one of the required access subcategories can have an associated value that is alphanumeric and another of the required access subcategories can have an associated value that is numeric. Where multiple access subcategories are used for each access category, the subcategory value indicator 322 can be used to indicate if, or how many, access subcategory values have been entered. For example, the subcategory value indicator 322 can have one or more states to indicate the number of values entered.

Figure 3E:
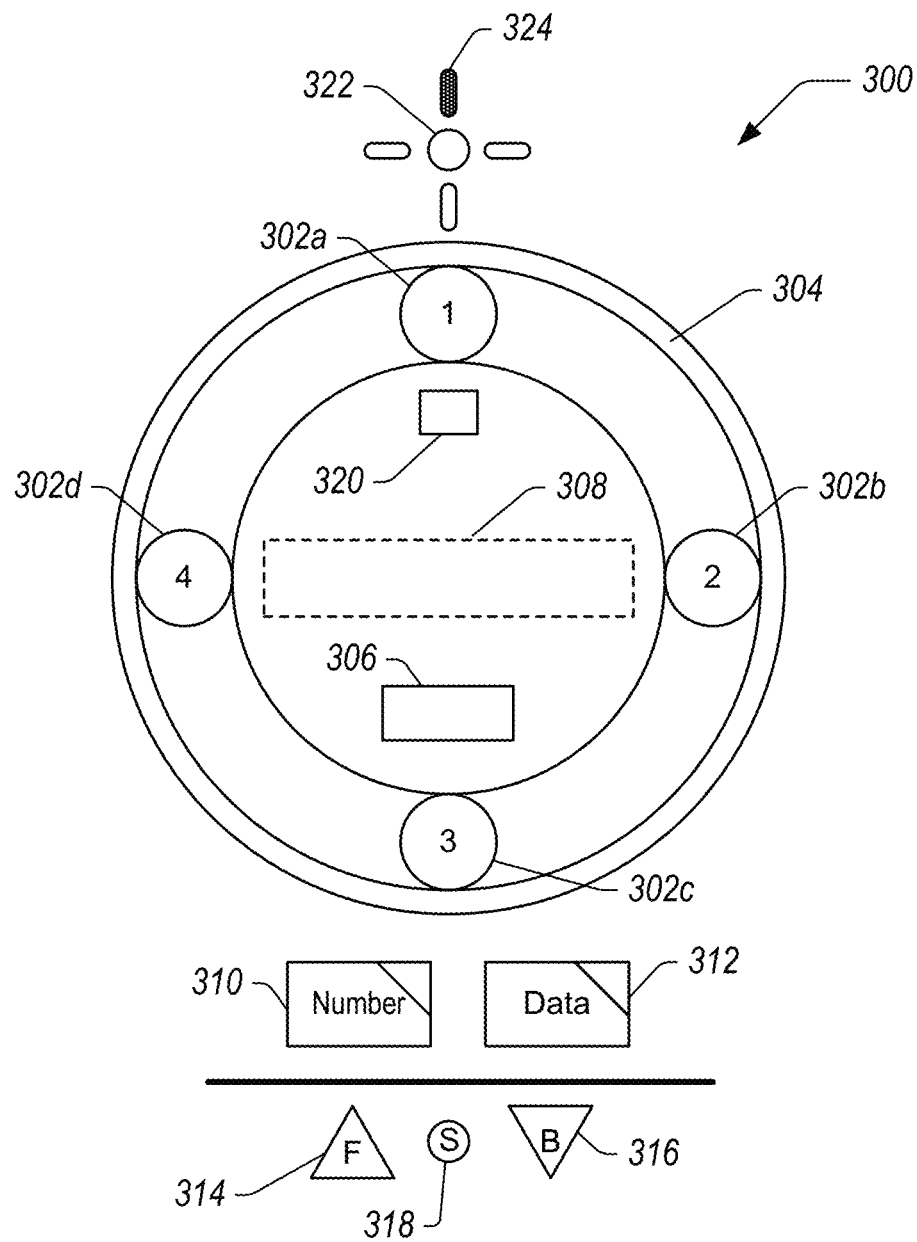

In some embodiments, the device requires a plurality of access categories to be entered for the authentication process. The authentication progress indicator 324 can be used to indicate how many access categories have been completed. As illustrated in FIG. 3E, the authentication progress indicator 324 shows that one access category has been entered and the device is awaiting selection of a second access category (e.g., the active category image 304 is in the first state). The authentication process can then proceed as with the first access category, proceeding to selection of one or more access subcategories for the second access category, and so on.

Upon successful completion of the multi-stage authentication process, the unlock action is complete. Upon completion of the unlock process, the device unlocks and displays on the touch screen user-interface objects associated with normal operation of the device. A user may interact with the user-interface objects to activate an application or perform an operation. In some embodiments, the device goes back to sleep if the authentication process is not completed in a predetermined period of time.

In some embodiments, the lock/unlock process may apply to specific applications that are executing on the device as opposed to the device as a whole. In some embodiments, an unlock process transitions from one application to another, for example, from a telephone application to a music player or vice versa. In some embodiments, as the user transitions from a first application and to a second application, a user interface for the second application may fade in (e.g., increase in intensity) and a user interface for the first application may fade out (e.g., decrease in intensity). The fade in and fade out may occur smoothly over a pre-determined time interval, such as 0.2 s, 1 s or 2 s. The pre-determined time interval may be in accordance with the unlock gesture, such as the time it takes the user to perform the gesture.

FIGS. 4A-4B illustrate the GUI display of a device in a user-interface lock state, according to some embodiments of the invention. In FIG. 4A, device 400 includes a touch screen 408. The device 400 is locked and the touch screen 408 is displaying an unlock image 410. The unlock image 410 includes indicators and graphical objects with which a user may interact to select access categories, access subcategories, and/or enter access subcategory values. As described above, the unlock image 410 may be displayed by the device 400 upon an event that may require the user's attention (e.g., incoming call or message) or upon user intervention (e.g., the user pressing the button 412 while the device is locked).

In FIG. 4B, the device 400 displays a magnified version of the unlock image 410 after entry of incorrect credentials. The magnification of the unlock image 410 makes it impossible to enter certain information in the authentication process. In this case, then, the user may choose to power the device off to enter the security violation screen, an example of which is illustrated in FIG. 5.

FIG. 5 illustrates an example security violation screen 500 that is entered after the device is powered on after an unsuccessful attempt to unlock the device. The security violation screen 500 includes elements of the unlock interface 300 described herein with reference to FIGS. 3A-3E, except that one or more elements are hidden, dimmed, displayed in a different state, or the like. The security violation indicator 520 can be used to indicate that the device expects a security violation value to be entered rather than a typical unlocking procedure. The device can detect contact with a number graphical object 510 or a data graphical object 512 to allow entry of alphanumeric or numeric data. Upon successful entry of a proper security violation value, the device can return to displaying the unlock interface to allow the user to attempt to unlock the device.

Figure 6A:
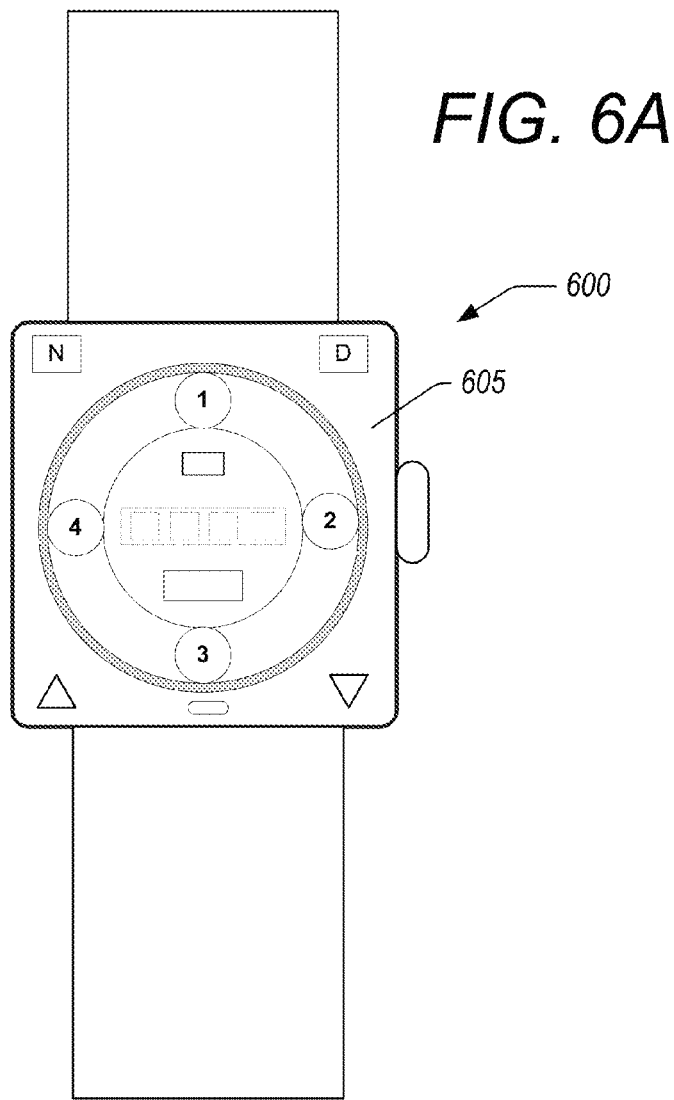
FIGS. 6A-6B illustrate examples of an unlock interface on a smartwatch device.
Figure 6B:
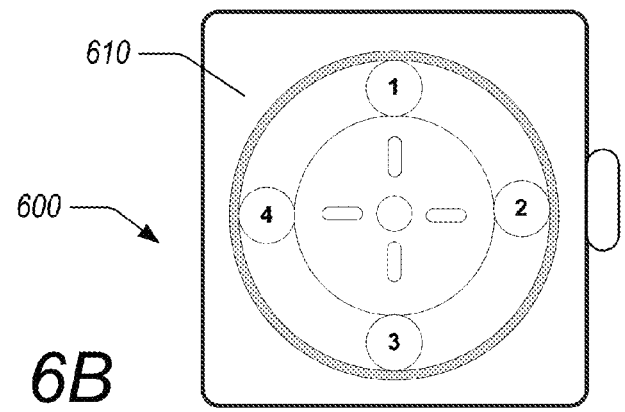

FIGS. 6A and 6B illustrate additional example embodiments of the unlock interface 605, 610 for use on devices 600 with smaller screens, such as a smartwatch. The first unlock interface 605 can be presented to accommodate the smaller screen, wherein the first unlock interface includes the graphical objects that allow selection of access categories and access subcategories as well as to enter access subcategory values, as described herein with reference to FIGS. 3A-3D. The second unlock interface 610 can include the graphical objects to indicate progress in the authentication process, as described herein with reference to FIGS. 3C-3E.

OPERATIONAL EXAMPLES

For purposes of illustration, examples of an authorization process will now be described. These examples are for illustrative purposes only and are not intended to limit the scope of the disclosure.

Example 1

Configuration of Authorization Credentials

The device can be configured to allow a user to configure the authorization credentials to be supplied to unlock the device. During a configuration process, using one or more configuration interfaces displayed by the device, a user can select one or more categories as part of the authentication process. In a simple example, the user selects a single access category. However, the user can select multiple access categories. In such a configuration, the device can require that each access category (along with the correct access subcategories and access subcategory values) be successfully entered.

In this simple example, the user selects an access category from a predefined list of categories or set names or the user creates a new category or a new set. For the selected category or set, the user further selects one or more subcategories or set elements to be part of the authentication process. In some embodiments, the device can require selection of 1 subcategory within each category. In some embodiments, the device can require selection of 2 subcategories within each category. In some embodiments, the device can require selection of 3 or more subcategories.

Each category can include a plurality of subcategories. In some embodiments, each category includes at least 4 subcategories, at least 5 subcategories, at least 6 subcategories, at least 7 subcategories, at least 8 subcategories, and so on. Each subcategory not selected to be part of the user's authentication process can be presented during the authentication process as a dummy subcategory. These dummy subcategories represent false or incorrect choices to decrease the probability that an unauthorized user guesses the correct authentication credentials.

For example, with reference to TABLE 1, if a user selects "TV Shows" as the category or set name, the user can select one or more of the subcategories "Actor Name," "Character Name," "Show Channel," "Show Genre," "Show Name," and "Season Number." In the example shown in TABLE 1, the selected subcategories are "Actor Name," and "Season Number," but any one of the subcategories can be chosen during the configuration process. During the authorization process, however, each of the listed subcategories will be presented as possible options for selection.

Further, as part of configuring the authentication process, a user can set values for each selected subcategory. In some embodiments, a subcategory can limit the type of information provided as the subcategory value. For example, a subcategory can be limited to numeric entries or limited to alphanumeric entries. Continuing the example from TABLE 1, the user may set a subcategory value for "Actor Name" to be Jerry Seinfeld and a subcategory value for "Season Number" to 5.

Example 2

Successful Attempt to Unlock a Device

With the device configured as described in Example 1, a successful attempt to unlock a device will now be described with reference to FIGS. 3A-3E.

Presented with the unlock interface 300 shown in FIG. 3A, the user touches the access category image 302b labeled "2" to indicate selection of the category "TV Shows." The user knows that the category corresponds to the image with the "2" because that was part of the configuration process. Upon selection of the access category, the active category image 304 changes states, as illustrated in FIG. 3B.

The device now begins to cyclically display values or images in the access subcategory image 306 corresponding to the subcategories in the category "TV Shows." For example, the device displays in sequence the words "Actor Name," "Character Name," "Show Channel," "Show Genre," "Show Name," and "Season Number" in the access subcategory image 306. The user can change what is displayed in the access subcategory image 306 by touching the forward arrow 314, the back arrow 316, the shuffle graphical object 318, or any combination of these. When a correct subcategory is displayed in the access subcategory image 306, the user can touch the access subcategory image 306 to select it.

Upon selection of the access subcategory "Season Number," the number graphical object 310 activates, as shown in FIG. 3C. In addition, the access subcategory value image 308 can become active or highlighted, as shown in FIG. 3C. The user touches the number graphical object 310 and enters the number "5," the value configured in Example 1, using a numeric keypad shown by the device or using some other method. After entering the number "5," the value entry indicator 322 can change to a second state to indicate that an access subcategory value has been entered.

The device can then repeat the process of cycling subcategories in the access subcategory image 306. When the subcategory "Actor Name" appears, the user can touch the access subcategory image 306, then touch the data graphical object 312, and then enter the value "Jerry Seinfeld" using a keyboard shown by the device or using some other method. An example of different credentials being entered is shown in FIG. 3D. After entry of the access subcategory value, the device unlocks.

Example 3

Unlocking a Device Using Two Access Categories

For example 3, the same procedure is repeated as in Example 2, except that the user has configured 2 access categories as part of the authorization process. After completion of the procedure described in Example 2, authentication progress indicator 324 can indicate that one access category has been completed, as shown in FIG. 3E. The user can then continue the access process beginning again at the stage of selection of an access category. This time, the user selects the correct second access category and repeats the process of selecting correct access subcategories and entering correct access subcategory values to gain access to the device.

Example 4

Unsuccessful Attempt to Unlock a Device

For Example 4, the same procedure is repeated as in Example 2, except that the user enters the number "3" instead of the correct value of "5." After the user completes the entire authorization process (i.e., after entering the value "Jerry Seinfeld" for the second access subcategory value), the device displays a magnified version of the unlock interface 300 shown in FIG. 3A. Because the difference between the input credentials and the correct credentials is minor, the unlock interface may be magnified slightly to allow another attempt to unlock the device.

Example 5

Multiple Unsuccessful Attempt to Unlock a Device

For Example 5, the same procedure is repeated as in Example 2 except that the user enters the wrong credentials at multiple points. For example, the user selects the access category corresponding to access category image 302a labeled "1." The user then selects a first subcategory within that access category and inputs a first value, and selects a second subcategory within that access category and inputs a second value. After inputting the second value, the device displays a magnified version of the unlock interface 300 shown in FIG. 3A.

This same procedure can be repeated (e.g., using different incorrect credentials) until the magnification of the unlock interface makes the interface unusable for unlocking the device. An example of such a magnified unlock interface is shown in FIG. 4B.

The user powers off the device in response to the unusable unlock interface. Upon powering on the phone, the user is presented with the security violation screen 500 shown in FIG. 5. The user enters a PIN code or a password. If the entered value is correct, the device then returns to showing the unlock interface 300 shown in FIG. 3A. If the entered value is incorrect or if there are a number of failed attempts, the device can enter a security alert state or some other state that denies access to all or part of the device, alerts a person or entity of the failed attempts, or the like.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as physical electronic hardware, or as a combination of computer software and physical electronic hardware. To clearly illustrate this interchangeability, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device configured to perform specific executable instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Although the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A method of unlocking a portable electronic device, the device including a touch-sensitive display, the method comprising:
    displaying on the touch-sensitive display an unlock interface comprising:
        a plurality of access category images, wherein each of the plurality of access category images is a graphical, interactive user-interface object with which a user may interact;
        an active category image different from the plurality of access category images, wherein the active category image is a graphical object that has two states, a first state prior to interaction with an access category image and a second state to indicate interaction with an access category image;
        an access subcategory image, wherein the access subcategory image is a graphical, interactive user-interface object with which a user may interact; and
        an access subcategory value image, wherein the access subcategory value image is a graphical object configured to display information corresponding to a received subcategory value;
    displaying the active category image in the first state;
    detecting a contact with the touch-sensitive display on one of the plurality of access category images displayed on the touch-sensitive display;
    loading an access category from memory corresponding to the access category image displayed at the detected contact;
    displaying the active category image in the second state;
    modifying the access subcategory image to display an image corresponding to one of a plurality of access subcategories, the plurality of access subcategories corresponding to the loaded access category;

detecting a contact with the touch-sensitive display on the access subcategory image displayed on the touch-sensitive display;

loading an access subcategory from memory corresponding to the access subcategory image displayed at a time of the detected contact;

receiving an access subcategory value;

modifying the access subcategory value window to display an image corresponding to the received access subcategory value;

comparing the loaded access category, the loaded access subcategory, and the received access subcategory value to stored access credentials, the stored access credentials comprising an unlock category, an unlock subcategory, and an unlock value;

if the loaded access category matches the unlock category, the loaded access subcategory matches the unlock subcategory and the received subcategory value matches the unlock value:

unlocking the portable electronic device; and ceasing to display the unlock interface; and if the loaded access category does not match the unlock category or the loaded access subcategory does not match the unlock subcategory or the received access subcategory value does not match the unlock value:

maintaining the device in a locked state; and displaying a magnified version of the unlock interface wherein the magnification is based at least in part on differences between the loaded access category and the unlock category, differences between the loaded access subcategory and the unlock subcategory, and/or differences between the received access subcategory value and the unlock value, wherein the unlock category, the unlock subcategory, and the unlock value are related to one another as logically related pieces of information.

2. The method of claim 1, wherein the unlock category comprises a radio station category, the unlock access subcategory comprises one of a city or a station call number, and the unlock value corresponds to the city or the station call number of the unlock access subcategory.

3. The method of claim 1, wherein the unlock category comprises a professional sports team, the unlock subcategory comprises one of a player jersey number or a team name, and the unlock value corresponds to the player jersey number or the team name of the unlock access subcategory.

4. The method of claim 1, wherein the unlock category comprises a television show, the unlock subcategory comprises one of a cast name or a show seasons number, and the unlock value corresponds to the cast name or the show seasons number of the unlock subcategory.

5. The method of claim 1, wherein the unlock category comprises arts awards, the unlock subcategory comprises one of an album name or an award year, and the unlock value corresponds to the album name or the award year of the unlock subcategory.

6. The method of claim 1, wherein displaying the magnified version of the unlock interface comprises displaying a portion of the unlock interface such that the portion fills the touch-sensitive display.

7. The method of claim 6, wherein the magnification increases by a first value if the loaded access category does not match the unlock category, by a second value if the loaded access subcategory does not match the unlock subcategory, and by a third value if the received access subcategory value does not match the unlock value.

8. The method of claim 7, further comprising aggregating the magnification over a plurality of unsuccessful unlock attempts.

9. The method of claim 8, further comprising entering a secured state after the portable device is powered on if the portable device is powered down after displaying the magnified version of the unlock interface.

10. The method of claim 9, wherein entering the secured state comprises displaying a secure lock interface comprising a parameter violation image, wherein the parameter violation image is a graphical, interactive user-interface object with which a user interacts to enter an exit code.

11. The method of claim 10, further comprising comparing the entered exit code to a stored exit code and displaying the unlock interface if the entered exit code matches the stored exit code.

12. The method of claim 1, wherein the unlock interface further comprises a plurality of mandatory access category images, wherein each mandatory access category image is a graphical object configured to display information corresponding to a number of mandatory access categories.

13. The method of claim 12, wherein the number of mandatory access categories corresponds to a number of access categories for which an access subcategory must be loaded and for which an access subcategory value must be received prior to unlocking the portable electronic device.

14. The method of claim 13, wherein the number of mandatory access categories is greater than or equal to 2.

15. The method of claim 14, wherein the number of mandatory access categories is less than or equal to 4.

16. A portable electronic device, comprising:

a touch-sensitive display;

memory;

one or more processors;

one or more programs stored in the memory and configured for execution by the one or more processors, the one or more programs including instructions for:

displaying on the touch-sensitive display an unlock interface comprising:

a plurality of access category images, wherein each of the plurality of access category images is a graphical, interactive user-interface object with which a user may interact;

an active category image different from the plurality of access category images, wherein the active category image is a graphical object that has two states, a first state prior to interaction with an access category image and a second state to indicate interaction with an access category image;

an access subcategory image, wherein the access subcategory image is a graphical, interactive user-interface object with which a user may interact; and an access subcategory value image, wherein the access subcategory value image is a graphical object configured to display information corresponding to a received subcategory value;

displaying the active category image in the first state;

detecting a contact with the touch-sensitive display on one of the plurality of access category images displayed on the touch-sensitive display;

loading an access category in response to the detected contact;

displaying the active category image in the second state;

modifying the access subcategory image to display an image corresponding to one of a plurality of access subcategories, the plurality of access subcategories corresponding to the loaded access category;

detecting a contact with the touch-sensitive display on the access subcategory image displayed on the touch-sensitive display;

loading an access subcategory in response to the detected contact;

modifying the access subcategory value window to display an image corresponding to a received access subcategory value;

unlocking the portable electronic device if the loaded access category matches a stored unlock category, the loaded access subcategory matches a stored unlock subcategory, and the received subcategory value matches a stored unlock value; and displaying a magnified version of the unlock interface if the loaded access category does not match the stored unlock category or the loaded access subcategory does not match the stored unlock subcategory or the received access subcategory value does not match the stored unlock value, wherein the magnification is based at least in part on differences between the loaded access category and the stored unlock category, differences between the loaded access subcategory and the stored unlock subcategory, and/or differences between the received access subcategory value and the stored unlock value.

17. The portable electronic device of claim 16, further comprising instructions to display a secure lock screen if the portable device is powered down after displaying the magnified version of the unlock interface.

18. The portable electronic device of claim 16, wherein each of the plurality of category images comprises a geometrical shape with text within the geometrical shape.

19. The portable electronic device of claim 16, wherein the unlock interface comprises at least one graphical object to indicate if there has been a security violation.

20. The portable electronic device of claim 16, wherein the unlock interface comprises at least one graphical object to indicate if at least one access subcategory value has been received.

21. The portable electronic device of claim 16, further comprising instructions to periodically change the access subcategory image displayed on the touch-sensitive display.

22. The portable electronic device of claim 16, further comprising instructions to change a displayed access subcategory image based on a detected contact with the touch-sensitive display on a change access subcategory image.

23. The portable electronic device of claim 16, wherein the user-interface object corresponding to the access subcategory value is configured to allow entry of text.

24. The portable electronic device of claim 16, wherein the user-interface object corresponding to the access subcategory value is configured to allow entry of a number.

25. The portable electronic device of claim 16, wherein the portable electronic device comprises a smartwatch.

26. The portable electronic device of claim 16, wherein the portable electronic device comprises a smartphone.

27. The portable electronic device of claim 16, wherein the portable electronic device comprises a tablet.

* * * * *